(12) United States Patent
Mehrgan

(10) Patent No.: US 12,545,402 B2
(45) Date of Patent: Feb. 10, 2026

(54) VTOL TAIL SITTING AIRCRAFT WITH ROTOR BLOWN NONPLANAR WING CONFIGURATION

(71) Applicant: Behrang Mehrgan, West Vancouver (CA)

(72) Inventor: Behrang Mehrgan, West Vancouver (CA)

( * ) Notice: Subject to any disclaimer, the term of this patent is extended or adjusted under 35 U.S.C. 154(b) by 683 days.

(21) Appl. No.: 16/016,568

(22) Filed: Jun. 23, 2018

(65) Prior Publication Data

US 2022/0169380 A1 Jun. 2, 2022

(51) Int. Cl.
*B64C 29/02* (2006.01)
*B64C 3/14* (2006.01)

(52) U.S. Cl.
CPC ................ *B64C 29/02* (2013.01); *B64C 3/14* (2013.01)

(58) Field of Classification Search
CPC ..... B64C 29/02; B64C 39/062; B64C 39/068; B64C 39/08; B64C 9/38
See application file for complete search history.

(56) References Cited

U.S. PATENT DOCUMENTS

| | | | |
|---|---|---|---|
| 158,312 A | 12/1874 | Read | |
| 217,585 A | 7/1879 | Clark | |
| 2,622,826 A | 12/1952 | Prince | |
| 3,834,654 A | 9/1974 | Miranda | |
| 3,985,317 A * | 10/1976 | Geraci | B64C 39/068 244/45 R |
| 4,856,736 A * | 8/1989 | Adkins | B64C 39/068 244/45 R |
| 5,765,783 A | 6/1998 | Albion | |
| 8,657,226 B1 * | 2/2014 | McGinnis | B64C 39/068 244/45 R |
| 9,550,567 B1 * | 1/2017 | Erdozain, Jr. | B64C 29/02 |
| 2011/0315809 A1 * | 12/2011 | Oliver | B64C 39/08 244/12.4 |
| 2017/0158312 A1 * | 6/2017 | Alber | B64C 29/02 |
| 2017/0217585 A1 * | 8/2017 | Hulsman | B64C 39/024 |
| 2020/0223542 A1 * | 7/2020 | Moore | B64D 27/24 |
| 2020/0317332 A1 * | 10/2020 | Didey | B64C 39/08 |

* cited by examiner

*Primary Examiner* — Timothy D Collins
*Assistant Examiner* — Terri L Filosi

(57) ABSTRACT

A tail sitting VTOL aircraft with nonplanar tandem rotor blown wing configuration, capable of traveling in an airplane mode with its fuselage oriented horizontally, and a hover mode during take-off and landing with its fuselage oriented vertically, with capability to have precise controlled hover, and capability of making controlled and safe assisted transition between two modes during a horizontal movement and without need for much headroom and overhead clearance. Transition from hover mode to airplane mode is performed by moving forward in hover mode and rotating the fuselage around the pitch axis by the assist of the moment created by differential thrust of the propellers, or the moment created by differential lift created by the rotor blown tandem airfoil-shaped cross section bodies or a combination of both.

21 Claims, 20 Drawing Sheets

| Name<br>Symbol | span efficiency | Set-up | Stacked / With Tail | Tandem |
|---|---|---|---|---|
| Closed bi-plane<br>1 | 1.46 | Set-up 1 | | |
| | | Inverted | | |
| C-wing<br>2 | 1.45 | Set-up 1 | | |
| | | Inverted | Downward swept wings and inverted tail both are possible, but lower than CG proprotors are unfavorable for an efficient transition | |

Fig.40

| Name Symbol | span efficiency | Set-up | Stacked / With Tail | Tandem |
|---|---|---|---|---|
| Winglet (U-wing) 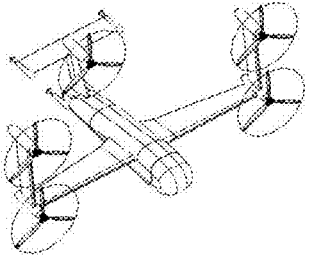 | 1.41 | Set-up 1 | 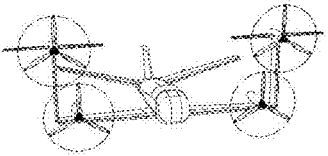 | 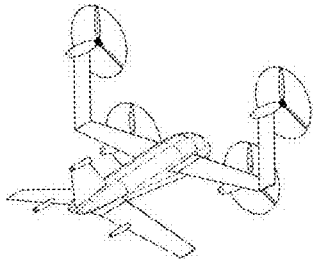 |
| | | Inverted | Downward swept wings and inverted tail both are possible, but lower than CG proprotors are unfavorable for an efficient transition | 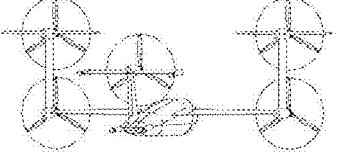 |
| Tip plated winglets 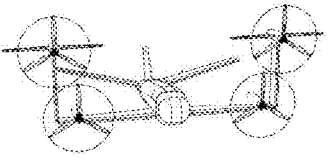 | 1.2 | Set-up 1 | 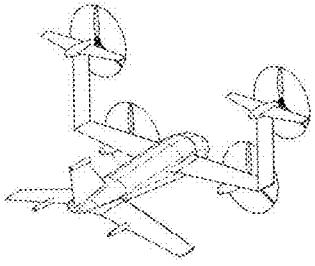 | |
| | | Inverted | Downward swept wings and inverted tail both are possible, but lower than CG proprotors are unfavorable for an efficient transition | |

Fig.41

| Name Symbol | span efficiency | Set-up | Stacked / With Tail | Tandem |
|---|---|---|---|---|
| Bi-plane 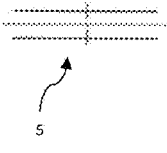 | 1.36 | Set-up 1 | 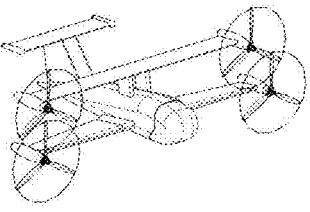 | 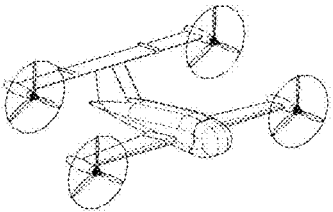 |
| | | Inverted | N/A<br>Wings symmetric over pitch axis<br>Only Tail may be inverted | 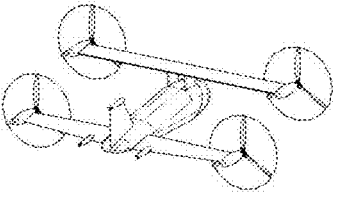 |
| X-wing 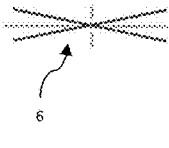 | 1.33 | Set-up 1 | 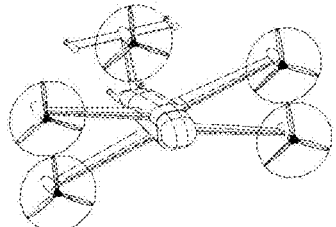 | 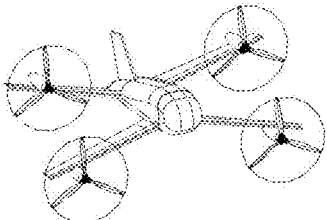 |
| | | Inverted | N/A<br>Wings symmetric over pitch axis<br>Only Tail may be inverted | 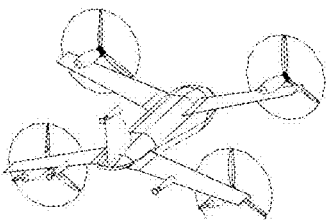 |
Fig.42

| Name<br>Symbol | span efficiency | Set-up | Stacked / With Tail | Tandem |
|---|---|---|---|---|
| Branched tips<br>7 | 1.32 | Set-up 1 | | |
| | | Inverted | N/A<br>Wings symmetric over pitch axis<br>Only Tail may be inverted | |
| Tip plates<br>8 | 1.38 | Set-up 1 | | |
| | | Inverted | N/A<br>Wings symmetric over pitch axis<br>Only Tail may be inverted | |

Fig.43

| Name Symbol | span efficiency | Set-up | Stacked / With Tail | Tandem |
|---|---|---|---|---|
| Joined Bi-plane 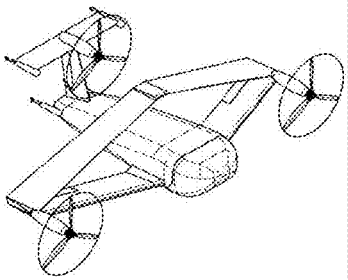 9 | 1.05 | Set-up 1 | 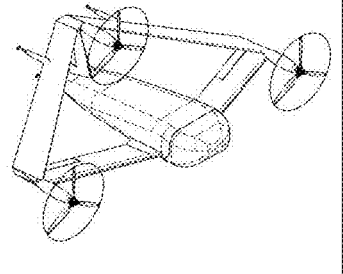 | 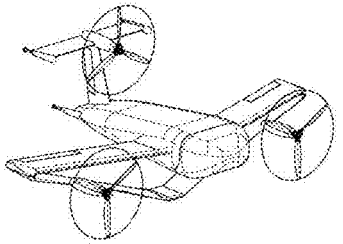 |
| | | Inverted | 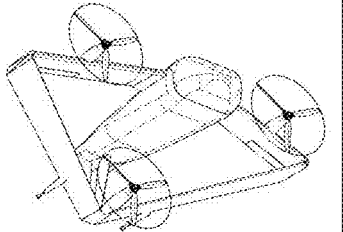 | |
Fig.44

VTOL TAIL SITTING AIRCRAFT WITH ROTOR BLOWN NONPLANAR WING CONFIGURATION

BACKGROUND OF THE INVENTION

1. Field of Invention

The present invention provides embodiments and solutions for safe control of vertical take-off and landing aircraft mainly aimed for transportation of human, or shipments in manual, semi-autonomous, or fully autonomous modes.

2. Description of the Related Art

There have been various attempts to make manned VTOL (vertical take-off and landing) tail sitting aircraft with the flight directional axis vertical when landed. However, there has been no successful project to pass prototype phase and enter mass production. The notable projects were "Convair XFY-1 Pogo (1954)", "Lockheed XFV-1 (1954)", and "Ryan X-13 Vertijet (1955)". These projects were all abandoned after the prototype phase.

Among all the patents and solutions provided in the category of VTOL aircraft with the directional axis of the flight vertical when grounded, there are four distinguishable approaches for transition of the aircraft flight directional axis from vertical to horizontal. The first approach; "Zoom Climb" which is used by the above-mentioned prototypes, is a method of turning the flight directional axis from Vertical to horizontal by going through a curved path, like a rocket. It can be flawlessly performed by a fighter jet, but needs a lot of power since the aircraft should pass the stall speed while moving nearly vertically upward. An example of this solution is patent No. U.S. Pat. No. 2,622,826 dated Dec. 23, 1954 by David C. Prince. All the next three approaches, unlike the first approach may make the transition while travelling horizontally.

The second approach is hover to cruise transition assisted by front facing wind: The aircraft starts in hover mode like a helicopter, and similar to a homemade kite, the aircraft is pulled against the wind (by its proprotors), and the moment created by the force of the front facing wind, helps the transition from vertical to horizontal. This approach is less predictable and riskier, but if performed correctly, can be done with much lower power requirement since the aircraft does not need to accelerate against the gravity. However, it's very challenging because before the transition, the angle of attack is nearly 90 degrees, which is much higher than the critical angle of attack of a traditional wing. There have been suggested solutions, but there have never been a really practical solution available. The best example of a solution is U.S. Pat. No. 5,765,783 Dated Jun. 16, 1998 by Nicholas Albion assigned to "The Boeing Company". It should be cited that according to the Boeing patent (Column 2, Paragraph 50), the transition is done by the lift created due to the front facing wind flow over the wings, which is wrong and not scientifically possible since at 90 degrees angle of attack, there can be no lift created by the wings. However, as mentioned above, the front facing wind may increase the air pressure at the bottom side of the wings and create pitch moment to perform the transition. This solution has good control in hover mode thanks to cyclic pitch control. However, during the transition the wings cannot produce any lift and the aircraft relies on the inertia which is not safe for manned vehicles. Even in Boeing patent, the invention is disclosed for UAV's UAVs (Unmanned Autonomous Vehicles). Furthermore, this solution requires cyclic pitch control for the proprotors which makes the machine complicated and expensive, while the present invention needs standard variable pitch proprotors and the variable pitch solution is the industry standard even for light and ultralight aircraft.

The Third approach has a multirotor configuration in hover mode. Similar to the second approach, the aircraft starts travelling horizontally but instead of relying on the front facing wind to create the moment to make the transition, the moment is created by the differentiating the thrust of proprotors at two sides of the center of gravity. An example of this approach is Patent No. US 2017/0217585 A1 Aug. 3, 2017 by Sander HULSMAN.

The fourth approach, is using rotor blown wings suggested by Sikorsky aircraft corporation under patent number US2017/0158312A1 Dated Jun. 8, 2017. The rotor blown wings are configured to be in the slipstream of the proprotors and the proprotors are configured to generate and direct airflow around the rotor blown wings. This approach uses selectively controlled control surfaces to change the aerodynamics of the rotor blown wings and create control surfaces in hover mode. The pitch moment for transition is created by the lift generated by the rotor blown wings.

Some individual and combined characteristics of the third and fourth approaches are present in the present invention.

Almost all of the embodiments of the present invention have a nonplanar wing configuration. A notable nonplanar wing configuration is patents U.S. Pat. No. 3,834,654 by L Miranda.

Patent No. U.S. Pat. No. 9,550,567B1 by Jack Erdozain provides embodiments of a UAV with foldable wings with a hover mode during take-off, landing and hover mode and an airplane mode with extended wings. The transition is performed during a maneuver which is dependent on the inertia of the aircraft. As mentioned before, relying on the inertia during the transition is unsafe for manned aircrafts aircraft. One embodiment of this invention has similar foldable wings.

BRIEF SUMMARY OF THE INVENTION

The present invention discloses a combined solution for high precision control of VTOL aircraft. Nonplanar wing configurations are not new concepts in aeronautics. Nonplanar wings are developed to enhance the span efficiency of the airplanes. However, incorporating a nonplanar wing configuration in a VTOL aircraft design provides new possibilities. First, a nonplanar wing configuration provides various wing planes those if being used as rotor blown wings in hover mode, can provide the possibility of both-longitudinal and lateral control of the aircraft by means of selectively controlled control surfaces on the rotor blown nonplanar wings (RBNPW). Rotor blown stabilizers, or rear wings, add to the control precision by enabling roll and pitch control in hover and transition modes. Second, a nonplanar wing configuration provides a suitable frame for supporting multiple proprotors on different planes with the combination being able to operate as a multirotor aircraft in hover mode. The right positioning of control surfaces on the wing assembly in the wash streamtube of multiple proprotors, in combination with variable pitch and variable speed proprotors all being controlled by a flight computer provides the possibility of a high precision hover control. With 3 or more proprotors, the solution provides combined multirotor/RBNPW control solution. With fewer than 3 proprotors, the solution still provides very precise RBNPW control. No cyclic control of the proprotors blades is required which makes the overall solution simpler.

The present invention is also focused on providing a safe transition between hover and airplane modes. As the first means of pitch control during transition, tandem rotor blown wings, or in general tandem rotor blown airfoil-shaped cross section bodies (wings, stabilizers) are utilized. It means having a pair of rotor blown airfoil-shaped cross section bodies acting as 2 main wings closer to the front of the aircraft, and another pair of rotor blown airfoil-shaped cross section bodies acting as a pair of wings or horizontal stabilizers closer to the aft of the aircraft. This set-up enables pitch control by differentiating the rotor-blown induced lift created by the front and rear airfoil-shaped cross section bodies. Using a multi-rotor set-up for pitch control adds the second means of pitch control for transition by differentiating the thrust of the proprotors to create moment around pitch axis. Having 2 means of pitch control guarantees a safe transition from hover mode to airplane mode even in bad weather conditions. Rotor blown tandem airfoil-shaped cross section bodies provide pitch control in all flight conditions and angles with no risk of stall. It may be named "Rotor blown nonplanar tandem wing" control (RBNPTW).

In addition to one or more of the features described above or below, or as an alternative, further embodiments could include wherein at least one of the horizontal wings may act as a rotor blown wing, being blown by the slipstream flow of at least one proprotor, in order to provide better stability in both hover mode, transition and low speed airplane mode, and may have at least one control surface to modify the aerodynamics of the blown wing in order to provide positive or negative lift which provides forces with vector of the forces parallel to the direction of flight in hover mode, and vertical to the ground in airplane mode.

In addition to one or more of the features described above or below, or as an alternative, further embodiments could include wherein the embodiment has at least one vertical wing that may act as a rotor blown vertical wing, being blown by the slipstream flow of at least one proprotor, in order to provide better stability and may have at least one control surface to modify the aerodynamics of the rotor blown wing in order to provide positive or negative lift which provides lateral forces with vector of the forces perpendicular to the direction of flight in hover mode to help better stability, and controlled lateral movements during takeoff, landing, hover and transition.

In addition to one or more of the features described above or below, or as an alternative, further embodiments could include wherein a vertical wing and a horizontal wing connected to each other at one corner of wing assembly, may act as combined rotor blown wings, being blown by the slipstream flow of a proprotor connected to the airframe, in order to provide better stability and may have at least one control surface each to modify the aerodynamics of the wings in order to provide positive or negative lift which provides forces with vector of the forces perpendicular and parallel to the direction of flight in hover mode.

In addition to one or more of the features described above or below, or as an alternative, further embodiments could include wherein the aircraft includes rotor blown stabilizers, being blown by the slipstream flow of at least one propeller supported by the airframe, where in hover mode, the control surfaces of the rotor blown horizontal stabilizers modify the aerodynamics of the wing in order to provide positive or negative lift which provides forces with vectors parallel to the direction of flight and result in pitch control, and the control surfaces of at least one fin modify the aerodynamics of the fin in order to provide positive and negative lift which provides forces with vectors of forces perpendicular to the direction of flight which results in roll control in hover mode and yaw control in airplane mode.

According to one aspect of the disclosure, a tail sitting VTOL with rotor blown nonplanar wing configuration may be configured with technically every type of nonplanar wing types. The generally discussed wing types are Bi-plane, X-wing, C-wing, Winglet nonplanar wing (U-wing), Bi-plane closed wing, Joined wing, Branched tips wings, Tip plates wing, and tip plated winglets.

According to one aspect of the disclosure, a tail sitting VTOL with rotor blown nonplanar wing configuration aircraft has a fuselage, and a C-wing configuration supported by the fuselage so that the C-wing center of lift is very close to the longitudinal position of center of gravity. Each wing assembly may include a nearly horizontal part which may be a rotor blown wing (RBW), a nearly vertical part which may be a rotor blown vertical wing (RBVW), and an optional nearly horizontal winglet which may also be a small rotor blown winglet. A tail assembly is connected to the rear of the vehicle. The horizontal stabilizers are preferred to be on distinguishably different plane(s) compared to the main wings in order to avoid aerodynamic interference. The tail may be located in the wash streamtube of a proprotor and form a rotor blown tail (RBT). At least 1 proprotor may be supported by the airframe and the aircraft may be configured so that the control surfaces of the rotor blown airfoil-shaped cross section bodies be located in the wash streamtube of the at least one proprotor. In order to add multirotor capabilities to the aircraft, at least 3 proprotors may be connected to the airframe in non-linear positions when viewed from the forward extremity of the aircraft in airplane mode. The proprotors may be connected to the airframe through rotatable drive shafts with the axes of proprotors substantially parallel to the flying directional axis of the aircraft in airplane mode. The proprotors simulate a multicopter in hover, takeoff and landing, and at least one of the proprotors provides thrust during airplane mode. The number and arrangement of the proprotors may vary to simulate a standard tricopter, quadcopter, hexacopter, octocopter, etc.

In addition to one or more of the features described above or below, or as an alternative, further embodiments could include wherein the C-wing solution may have a hinge connection between the horizontal and vertical parts of the wing, and the vertical part may rotate around the hinge to form an aircraft with long wingspan with better fuel efficiency for long distance flights, and capable to carry more load.

According to one aspect of the disclosure, further embodiments could include wherein a tail sitting VTOL aerial vehicle with rotor blown nonplanar wings has a closed wing configuration, including 2 pairs of wings, each pair having a right wing and a left wing, and a third pair of wings including a right wing connecting the first right wing and second right wing together, and a third left wing connecting the first left wing and the second left wing together.

In addition to one or more of the features described above or below, or as an alternative, further embodiments could include wherein when viewed from the forward extremity of the aircraft in airplane mode, the proprotors closer to the center of gravity (CG) of the vehicle, are bigger and of higher power, to carry the weight during multicopter mode, and/or provide thrust in airplane mode, and the proprotors farther from the CG are smaller, and of lower power, and are mainly used to provide required moment for transition, and/or thrust during cruise. In order to make it more understandable in this application the bigger rotors may be called high power proprotors, or weight carrying proprotors, while the smaller ones, may be called low power proprotors or transition assist proprotors.

In addition to one or more of the features described above or below, or as an alternative, further embodiments could include a method to increase the power efficiency, wherein at least one proprotor has blades optimized for multirotor hover mode, and have feathering capabilities for airplane mode, and at least one proprotor, has blades optimized for high speed airplane mode.

In addition to one or more of the features described above or below, or as an alternative, further embodiments could include wherein the proprotors may have electric motors. And the aircraft may have rechargeable batteries as one source of power.

In addition to one or more of the features described above or below, or as an alternative, further embodiments could include wherein at least one of the proprotors may have a hybrid propulsion system including an electric motor that may also work as a power generator, and an internal combustion engine, which may drive the proprotor, or/and the generator. The generated power may be used to charge the batteries or provide power for other proprotors. The proprotor shaft may be disconnected and the proprotor blades may be feathered so that the genset combination provides power when the proprotor is stopped and feathered during airplane cruise mode.

In addition to one or more of the features described above or below, or as an alternative, further embodiments could include wherein a combination of an internal combustion engine and a power generator may be located in the fuselage or a nacelle to provide power to recharge the batteries or/and drive the electric motors.

In addition to one or more of the features described above or below, or as an alternative, further embodiments could include wherein parts of the airframe may be covered by solar panels, in order to supply additional power as an auxiliary power source.

In addition to one or more of the features described above or below, or as an alternative, further embodiments could include wherein at least one of the proprotors nacelles is connected to the connection point of a nearly horizontal and a nearly vertical wing.

In addition to one or more of the features described above or below, or as an alternative, further embodiments could include wherein at least one of the proprotors nacelles is connected to the connection point of a nearly horizontal and a nearly vertical wing, and the nacelle includes a built in hinge so that the nearly horizontal and the nearly vertical parts of the C-wings can rotate relatively around the axis of the hinge.

In addition to one or more of the features described above or below, or as an alternative, further embodiments could include wherein a tail sitting VTOL with rotor blown nonplanar wings aerial vehicle has rotor blown stabilizers and at least 1 proprotor. All or a portion of the resultant torque applied by the proprotors to the airframe in hover mode, may be compensated by actuation of at least one elevator at one side of the tail resulting in relatively positive lift, and actuation of at least one elevator at the opposite side of the tail resulting in relatively negative lift.

In addition to one or more of the features described above or below, or as an alternative, further embodiments could include wherein a tail sitting VTOL rotor blown nonplanar wing aerial vehicle has 2 rotor blown wings and at least 1 proprotor. The all or a portion of the resultant torque of the at least 1 proprotor in hover mode, may be compensated by actuation of at least one control surface on one of the wings resulting in relatively positive lift, and actuation of at least one control surface on the opposite wing resulting in relatively negative lift. It should be clarified that an odd number of proprotors may result in uncompensated torque applied to the airframe. Also an even number of proprotors with different diameters may result in uncompensated torque in different flight conditions.

BRIEF DESCRIPTION OF THE SEVERAL VIEWS OF THE DRAWINGS

FIG. 40, Illustrates wing types "Closed wing" 1 with four different configurations and "C-wing" 2 with three different configurations.

FIG. 41, Illustrates wing types "Winglet" 3 (U-wing) and "Tip plated winglets" 4 with three different configurations each.

FIG. 42, Illustrates wing types "Bi-plane" 5 and "X-wing" 6 with three different configurations each.

FIG. 43, Illustrates wing types "Branched Tips" 7 and "Tip Plates" 8 with Three different configurations each.

FIG. 44, Illustrates wing type "Joined wing" 9 with four different configurations.

DETAILED DESCRIPTION OF THE INVENTION

Figure 1:
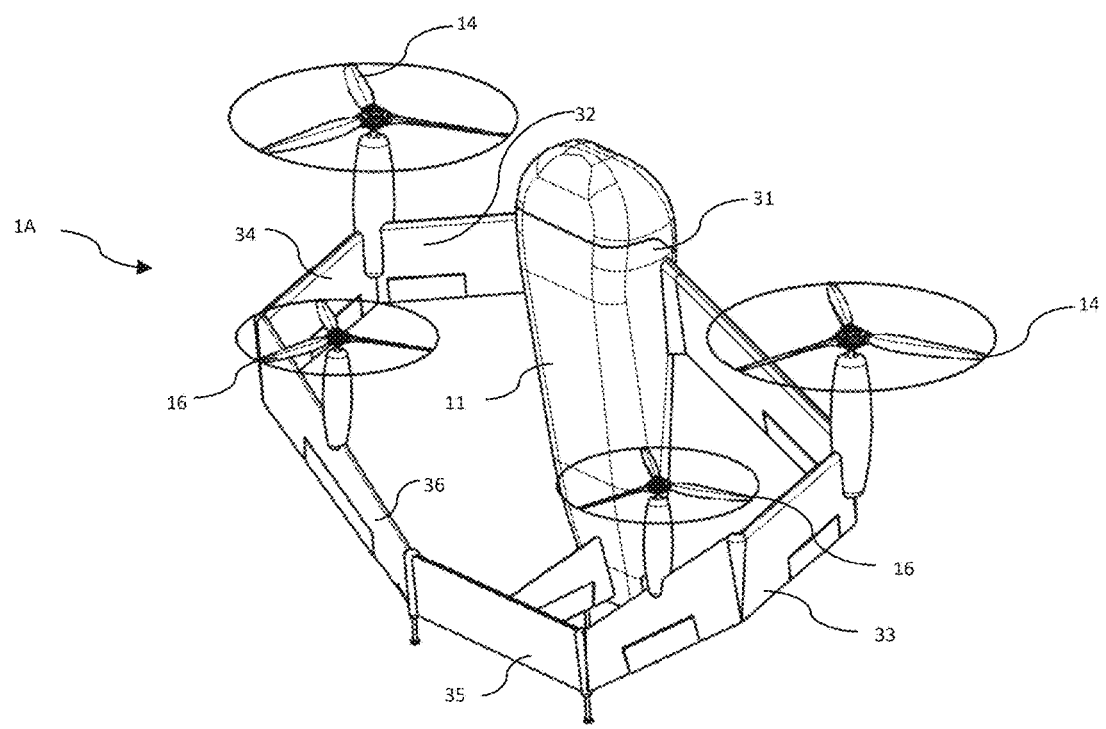
FIG. 1, is a perspective view of an embodiment of a tail sitting VTOL with rotor blown closed wing configuration in hover mode with 4 proprotors supported by the closed wing frame. The proprotors connected to the first pair of wings are bigger and the proprotors connected to the second pair of wings are smaller. Exemplary control surfaces are shown on the vertical and horizontal wings and the secondary rear wings.

A detailed description of the embodiments of the disclosed invention and methods is presented herein by way of exemplification and not limitation with reference to the Figures.

A tail sitter VTOL aircraft includes several elements that are found in all the embodiments. A further or repeated description of those elements will be omitted from the following descriptions. It is to be understood that these elements may include but are not limited to, the electric motor, the batteries, the power generation unit (i.e., the internal combustion engine, the gas turbine engine, the electrical motor-generator or the hybrid engine), the flight control computer, the alighting elements.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiments may include only some of the described exemplary aspects. Accordingly, the disclosure is not to be seen as limited by the foregoing description, but is only limited by the scope of the appended claims.

The terminology used herein is for the purpose of describing particular embodiments only. It is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, element components and/or groups thereof.

It should be clarified that the term "Nonplanar" when used for airplane wings refers to the wings with distinguishably different planes and orientations. In solid geometry however, the term can refer to any 2 planes those are even very close, but not coincident. Considering the solid geometric definition, every traditional airplane with a wing dihedral angle as low as 1 degree, may be interpreted to have nonplanar wings. However, in aeronautics, the terms "Nonplanar wings", "Dihedral wings", "Polyhedral wings" and "Anhedral wings" are well defined categories and should not be misunderstood. It should be readily understood that the terminology used in this document corresponds with names and categories in the field of aeronautics and may not be 100% in line with the ones in solid geometry.

Various embodiments presented in this document have horizontal stabilizers on the aft of the aircraft. Some aircraft embodiments however, for example biplane tandem wing aircraft, and closed tandem wing (or box wing) aircraft have a second pair of wings connected closer to the aft of the aircraft those also replace horizontal stabilizers. Based on the disclosed embodiments, both phrases "Horizontal Stabilizer" and "Rear wing" have been used. However, where a sentence refers to wings and stabilizers (including horizontal or vertical stabilizers), the phrase "airfoil-shaped cross section body" is used as a general term. The best intention of the inventor is to avoid inconsistent terminology. However, due to the variety of possible solutions, eliminating one of the said phrases is not possible.

The phrase "a pair of wings" which is repeatedly mentioned in this document, corresponds to a right wing and a left wing those are preferred to be of the same type and in a rather symmetric set-up. However, a left wing and a right wing may be interconnected and form a single body. But even in that case, a right wing is still called a right wing, even if it is interconnected with the left wing forming a single body.

The present invention suggests embodiments of VTOL aircraft with "Rotor blown nonplanar wing" and "Rotor blown nonplanar tandem wing" configurations. A nonplanar wing configuration creates a proper structure for connection of multiple rotors. However, the slipstream of the rotors passes over the nonplanar wings and may create multiple rotor blown airfoil-shaped cross section bodies in different orientations which can provide exceptional control possibilities in hover, transition, takeoff and landing. No cyclic control of the proprotors blades is required which makes the overall solution simpler.

The present invention is intended to carry human. Therefore utilization of safe methods for transition of the aircraft flight directional axis from vertical to horizontal is essential. The present invention uses rotor blown wings in order to carry the weight of the aircraft during the transition to assure the safety of passengers. However, in order to perform a safe and controlled transition, it may rely on 2 different means for creating moment around the pitch axis. As the first means of pitch control during transition, tandem rotor blown airfoil-shaped cross section bodies (wings, stabilizers) with control surfaces are employed. The concept means having two pairs of rotor blown airfoil-shaped cross section bodies in tandem configuration. For example, a first pair of rotor blown airfoil-shaped cross section bodies in the form of a pair of front wings, being closer to the fore of the aircraft, and a second pair of rotor blown airfoil-shaped cross section bodies (e.g. a pair of rear wings or horizontal stabilizers) being closer to the aft of the aircraft. This set-up enables pitch control by adjusting the rotor-blown induced lift created by the tandem airfoil-shaped cross section bodies by control surfaces. Using a multi-rotor set-up for pitch control adds the second means of pitch control for transition by differentiating the thrust of the proprotors to create moment around pitch axis. Having 2 means of pitch control guarantees a safe and controlled transition from hover mode to airplane mode in different weather conditions. Especially in bad weather conditions, the present invention can be very effective since based on various researches; the proprotor wash reduces and in some cases completely eliminates the effect of the wind on rotor blown wings.

Controlling the pitch with tandem rotor blown cross section bodies is provided with 2 distinguishable approaches. The first approach is using tandem wings where there is a pair of front wings with the center of lift of them between the longitudinal position of the center of gravity of the aircraft and the fore of the aircraft and a pair of rear wings close to the aft of the aircraft. The weight of the aircraft is distributed between the front and rear wings. The rear wings may replace the horizontal stabilizers. This approach is more favorable when short wingspan is required. The pitch control is done by varying the rotor blown induced lift of the front and rear wings. As a simple example, when the aircraft flies in stable condition with no rotation around pitch axis, increasing rear wings induced positive lift and/or decreasing front wings induced positive lift results in pitch down moment. Decreasing rear wings induced lift and/or increasing front wings induced lift results in pitch up moment. However, as a general rule:

Pitch down moment can be increased when:
(Changes in Rear Lift)−(Changes in front lift)>0
Pitch up moment can be increased when:
(Changes in Rear Lift)−(Changes in front lift)<0

The Second approach is using at least one pair of main wings, with the center of lift of the wings very close to the longitudinal position of the center of gravity of the aircraft, and having a pair of rotor blown stabilizers at the aft of the aircraft. In this approach, the weight is solely carried by the main wings, while the stabilizers provide pitch stabilization and pitch control using control surfaces. This solution is less favorable when short wingspan is required.

A list of possible nonplanar wing configurations is presented in FIG. 40 to FIG. 44 The listed nonplanar wing types are based on "Highly Nonplanar Lifting Systems" paper by, Ilan Kroo, Stanford University, John McMasters, Boeing Commercial Airplane Group, and Stephen C. Smith, NASA Ames Research Center. It should be readily understood that the term nonplanar wing configuration is not limited to the mentioned list only. The types of nonplanar wings suggested by the tables subject to FIG. 40 to FIG. 44 include: "bi-plane", "X-wing", "Closed wing", "Joined wing", "C-wing", "U-wing" (Wings having winglets, preferably with control surfaces), "Branched Tip wings", "Tip Plates", and "Tip plated winglet". FIG. 40 to FIG. 44 illustrate 4 different configurations for each of the aforementioned wing types. Every type of wing can be arranged in a Tandem configuration; having one pair of wings closer to the fore of the aircraft, and another pair of wings closer to the aft of the aircraft. Bi-plane, X-wing, Bi-pane closed wing, and Joined wings are the types those basically have 2 pairs of wing and a tandem configuration can be created easily. However, other types: C-wing, U-wing, Branched tips wings, Tip plates wing, and tip plated winglets, are the types those only have one pair of wings. For the types with one pair of wings, another pair of wings should be added In order to create a tandem type. The rear wings may be in the streamtube wash of proprotors mounted on the front wings to avoid extra proprotors for the rear wings. The rear wings may be simple wings or another set of nonplanar wings. The wings may be anhedral or dihedral. All the mentioned wing configurations may also be inverted to develop new types. Even the tails can be inverted to create more new types. Whenever a tandem wing configuration is employed, in some embodiments, it is possible to have a front and a rear wing in the same plane. However, it's generally preferred that the front and rear wings being configured in different heights (Distinguishably distant planes) or angles in order to avoid aerodynamic interference between them. In case of suggested configurations, it is preferred to have the front wing at lower height, and in case of the inverted configurations, the front wing is at higher height. The number and placement of the proprotors is not a subject of the present invention. However, it can be readily understood that taking into account the different proprotor configurations, the number of possible embodiments can be technically unlimited. However, the disclosed claims are intended to cover all the possible wing configurations. It is possible to invert some wing types including C-wing, U-wing, Tip plated winglet and have the wings upside down, with the vertical wings swept downward. However, as it will be described later, lower than CG proprotors are not favorable for an efficient transition.

Figure 39:
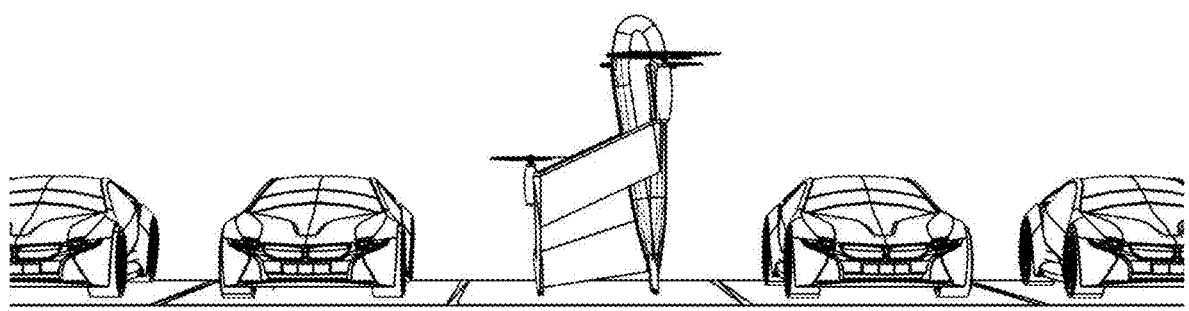
FIG. 39, Illustrates a landing and takeoff scenario when a tail sitting VTOL with nonplanar tandem rotor blown wing configuration is intended to be able to takeoff and land in a standard size parking and control precision is essential due to the nature of surrounding objects.

FIG. 39. Illustrates a landing and takeoff scenario when a ail sitting VTOL with nonplanar tandem rotor blown wing configuration is intended to be able to take off and land in a standard size parking and control precision is essential due to the nature of surrounding objects. For such applications, it is essential to have very short wingspan and for this reason, nonplanar wings with high span efficiency and especially tandem configurations are favorable.

Figure 29:
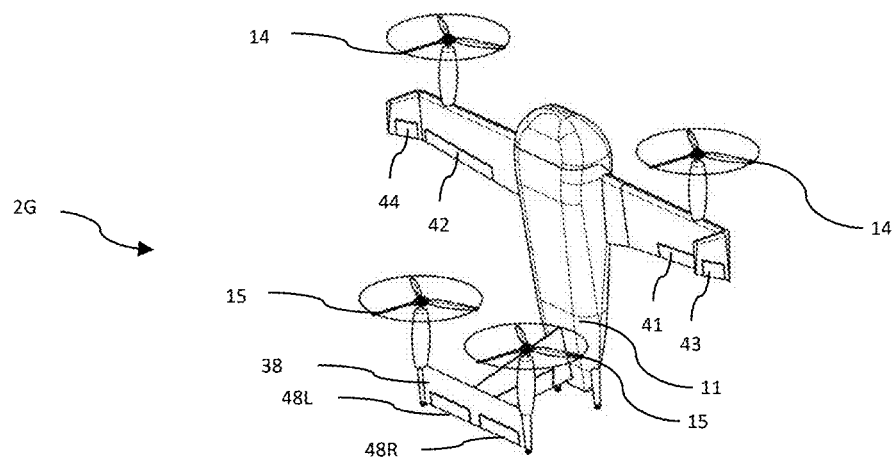
FIG. 29, is a perspective view of an embodiment of a tail sitting VTOL with rotor blown horizontal and vertical wings in hover mode with 2 proprotors connected to the rotor blown wings, and 2 proprotors connected to the rotor blown tail. Exemplary control surfaces are shown on the vertical and horizontal wings and the tail assembly.
Figure 33:
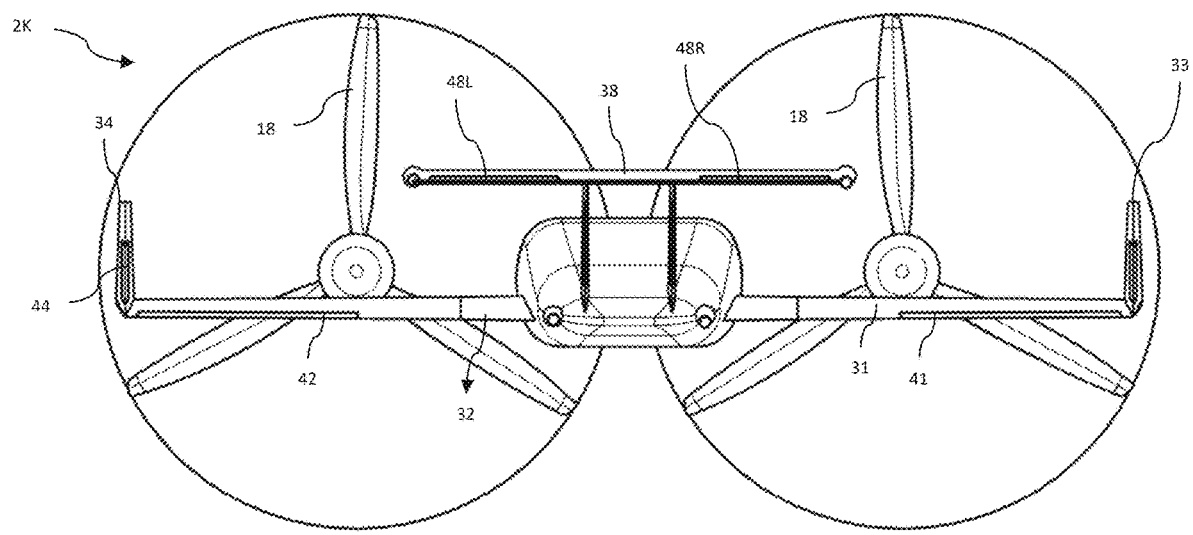
FIG. 33, is a back view of an embodiment of a tail sitting VTOL with rotor blown horizontal and vertical wings in airplane mode with 2 big proprotors connected to the rotor blown wings. Exemplary control surfaces are shown on the vertical and horizontal wings and the tail assembly.

The novelties in the present invention include but are not limited to:

a. Rotor blown vertical wing with selectively controlled control surfaces: The vertical wings of a nonplanar wing configuration, generally shown in all drawings as numbers 33, 34, when configured to operate as rotor blown wings, can create lateral forces in hover mode to control lateral movements, or may be used for improving stability of the aircraft.

b. Rotor Blown horizontal stabilizers with selectively controlled control surfaces: In hover mode rotor blown horizontal stabilizers 38 as shown in FIG. 29 may be used to adjust the pitch angle. With aircraft in standstill, and with all proprotors providing equal thrust, it is possible to adjust pitch of the aircraft using the control surfaces of a rotor blown horizontal stabilizer. During the transition, rotor blown horizontal stabilizers can provide sufficient lift at the aft of the aircraft to assist the transition. Rotor blown horizontal surfaces may be replaced by rear wings in a closed wing or tandem wing configuration.

c. Rotor blown vertical stabilizers with selectively controlled control surfaces: In the hover mode a rotor blown vertical stabilizer may be used to adjust the roll angle. A rotor blown vertical stabilizer is shown as 39 in FIG. 11.

d. Multirotor VTOL with nonplanar tandem rotor blown airfoil-shaped cross section bodies and control surfaces: An exemplary embodiment is shown as 2G in FIG. 29. A multirotor may be benefitted from multirotor control methods for stabilization, and in the meantime use the rotor blown control surfaces for controlled movements. The differential trust on the proprotors may also be used at the time of transition from vertical flight to horizontal flight. In hover mode, the altitude of the aircraft may be adjusted by controlling the overall thrust of the proprotors, while controlling Pitch, Yaw, and roll, and longitudinal and lateral movements may be done by the control surfaces of the nonplanar tandem rotor blown wings, or by the differential thrust of the proprotors, or a combination of both. The word "tandem" refers to the fact that some of the rotor blown airfoil-shaped cross section bodies may be connected closer to the fore of the aircraft, and some other may be closer to the aft of the aircraft. Pitch control may be provided by differentiating the rotor blown induced lift created on the fore and aft of the aircraft.

e. Since the Yaw, roll and pitch may be adjusted by rotor blown wings and not differentiating the lift of the proprotors, it is possible to have asymmetric weight distribution and having eccentric CG resulting in non-homogeneous weight distribution between proprotors and having non-identical proprotors. Since roll/pitch control is not dependent on differential thrust of the proprotors like a traditional multirotor aircraft, the proprotors can basically create fixed thrust in hover mode. It is possible, for example to have 2 big and 2 small proprotors. The weight distribution may be asymmetric and apply more load on the bigger proprotors. In general, big proprotors are not very efficient at airplane mode high speeds and can be feathered, while small proprotors may have increased speed and pitch at airplane mode and operate with higher efficiency at higher speeds comparing with the bigger ones.

f. VTOL with rotor blown nonplanar tandem wings and control surfaces: An exemplary embodiment is shown as 2K in FIG. 33. It is differentiated from embodiment 2G by lack of multirotor control mode. A VTOL may have at least one proprotor, and a rotor blown nonplanar wing configuration. In hover mode, the altitude of the aircraft may be adjusted by controlling the lift created by the at least one proprotor, while controlling Pitch, Yaw, and roll, and longitudinal and lateral movements may be controlled by the rotor blown control surfaces of the nonplanar tandem rotor blown surfaces.

g. Proprotor torque effect compensation in hover mode: In hover mode, in case of using odd number of proprotors or in case of having non-identical proprotors, there may be uncompensated overall torque applied by the proprotors to the airframe. This torque results in unwanted yaw in hover mode. The uncompensated torque can be compensated by the means of the rotor blown control surfaces on the wings, and stabilizers.

Comparison with the Exiting Art:

None of the Nonplanar wing configurations, Rotor blown wings, and multirotors are new concepts. However, the new combinations disclosed in the present invention provide new sets of characteristics those are not available in any of the previous art. The key differentiating point between the above-mentioned novelties and the previous art will be described in the following paragraphs:

Nonplanar wing configurations are developed to increase span efficiency of an airplane. Incorporation of the nonplanar wings in a VTOL aircraft as disclosed in the present invention, not only improves span efficiency in airplane mode, but provides benefits in 2 areas: The nonplanar wing configuration may be used as a base structure for connection of Plurality of proprotors those can operate as a multirotor. Closed wing aircraft for instance, are characterized by having a rather rigid wing frame. Nonplanar wing configurations, for example box wing and c-wing configurations, can create a rectangular frame that may be used for assembly of plurality of proprotors in different patterns to form a quadrotor, hexarotor, etc., Furthermore, with proprotors configured to generate and direct airflow around various areas of the nonplanar wing configuration, by use of selectively controlled control surfaces, longitudinal and lateral control forces and control moments may be created in various plans. So the disclosed invention and novelties are clearly distinguishable from existing patents in the field of nonplanar wing aircraft.

Multirotor aircraft or multicopters have long been in production for UAV applications and a few manned versions have almost passed the prototyping phase. The method of control for traditional multicopters is rolling the whole body of the aircraft to the desired direction, and use the horizontal component of the rotors lift for moving the aircraft. Comparing with the previously patented VTOL aircraft with multirotor configuration, the present invention is differentiated by using selectively controlled control surfaces on rotor blown nonplanar blown airfoil-shaped cross section bodies to provide controlled force vectors for longitudinal and lateral movements and controlled moments around pitch, roll and yaw axis. These controls are available during hover, landing, takeoff and transition, while in traditional vertical to horizontal convertible aircraft with multicopter/multirotor solutions, the hover movements are only provided by rolling the whole body of the multicopter in desired direction, which unlike RC models, is not responsive enough on bigger, heavier aircraft due to the higher inertia of the big mass. Also the transition from hover mode to airplane mode may also be assisted by the moment created around the center of gravity (CG) by rotor blown control surfaces of the tail or rear wings on a tandem wing configuration. In the meantime, in case of the previous art with multirotor hover solution, during the transition, since the proprotors rotate from vertical to horizontal, the lift created by the proprotors considerably decreases at angles of attack around 30~20 degrees, while the lift created by the wings replaces it when the angle of attack drops below the critical angle of attack which is about 15 degrees for a traditional wing. However, there will be a gap in between, since as long as the angle of the attack is above 15 degrees, there is technically no lift created by the wings. For example, when the multicopter pitches forward for 60 degrees which means the angle of attack will be decreased from 90 to 30 degrees, the lift component of thrust created by the proprotors drops by 50%, while there is still no lift created by the wings since the angle of attack is 30 degrees. For this reason, the traditional multirotor convertibles should rely on momentum during the transition, which is fine for a UAF, but very dangerous for a manned vehicle. The subject of the present invention gets benefitted by the lift created by the rotor blown wings during the transition which eliminates reliance on momentum. Thus, the present invention provides much better pitch control due to generally offering a tandem rotor blown airfoil-shaped cross section bodies. While Sikorsky only relies un quadcopter differential trust of the proprotors. Sikorsky solution uses X-wing configuration, but the X-wing configuration used in the present invention is very different. As Shown in FIG. 42, an X-wing configuration used for the present invention weather has a tail, or has a tandem configuration. Having overlapping proprotor disks proves that in Sikorsky solution, the wings can only be stacked and are not tandem and are more and less on the same longitudinal position of the aircraft fuselage. On Sikorsky solution, there is no rotor blown vertical wing to provide precise and responsive lateral movement control. The Sikorsky solution is basically for a tail-less aircraft, while tail and stabilizers are an essential part of the present invention. Therefore, there is no rotor blown horizontal stabilizer or rear rotor blown wings to assist transition and to provide quick response pitch stability control during hover and transition. Also in case of the Sikorsky solution, there is no rotor blown vertical stabilizer for roll stability, and controlled roll control during hover. Generally speaking, the Sikorsky invention relies on one means of transition while the present invention uses two different means of transition. Furthermore, the Sikorsky method is basically developed to provide better airflow around the rotor blown wings by overlapping proprotors disks. In order to avoid collision between the proprotors, the proprotors are synced by the means of a drive shaft between each pair of the proprotors. For this reason, the Sikorsky solution is basically limited to 4 proprotors, while the present invention technically has no limitation about the number of proprotors. Therefore, the present invention is clearly distinguishable from the prior art.

Figure 34:
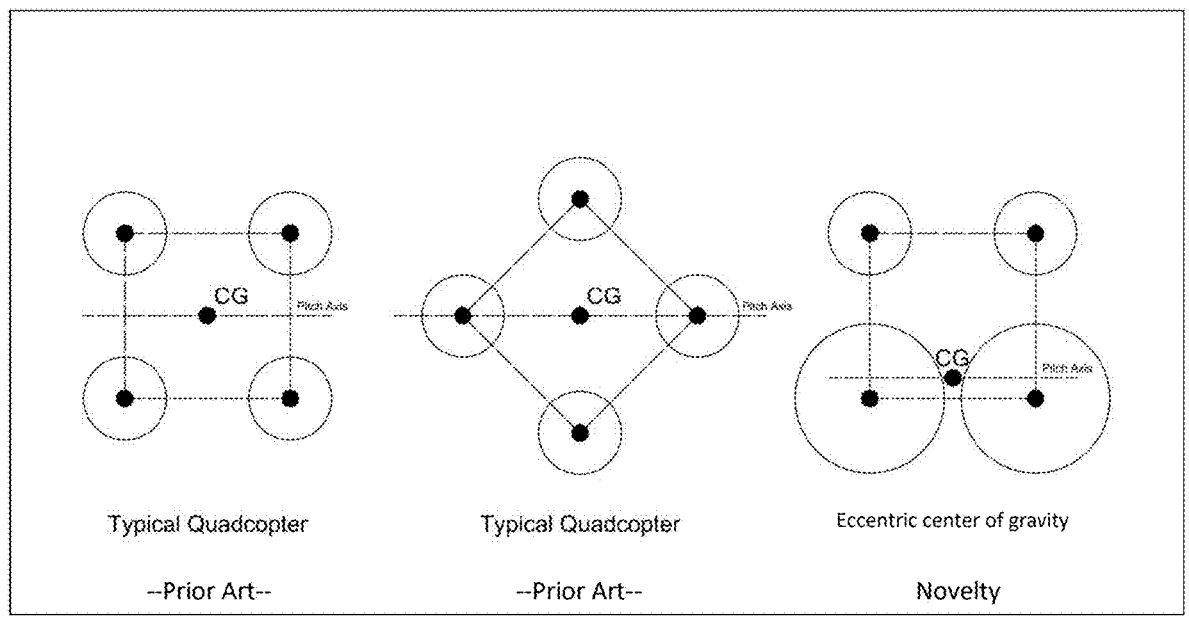
FIG. 34, is a diagram disclosing the difference in weight distribution of some embodiments of the present invention with asymmetric weight distribution, with typical multicopter solutions used in other cited patents.

Another point of differentiation between some embodiments of the present invention and the existing art with multirotor hover mode is that In case of all the previous patents, according to the set-ups chosen by the inventors, during the takeoff, landing and hover mode, the CG (center of gravity) of the aircraft, is as close as possible to the center of the area covered by the axes of the rotors, in order to provide the best stability during the hover. In other words, in case of the prior art, the center of gravity is in the middle of the rotors in hover mode. It provides equal disk loading and the best weight distribution between the rotors in multicopter/hover mode. However, a more stable solution makes the transition from multirotor mode to airplane mode harder. Most of the embodiments of the present invention however, are intentionally less stable in one direction, which makes the transition much easier. FIG. 34, Portrays that how some embodiments of the present invention are differentiated from the previous art. In case of the cited patents, if zoom climb transition is not desired, in order to perform transition from vertical to horizontal, the aircraft should start horizontal movement in helicopter mode and speed up until its speed surpasses its theoretical airplane stall speed by a safe margin. Then it should make a quick maneuver and pitch down (forward) around the pitch axis which nearly passes through its center of gravity. In this condition, the motors located in upper side of the center of gravity (in airplane mode), should provide higher thrust, while the motors located at the lower side (in airplane mode), should provide no thrust, or even negative (braking) thrust to help a quick transition. Negative thrust in such a critical condition can be really dangerous. In such conditions, an unfavorable gust of wind may force the aircraft into stall.

In contrary, in some embodiments of the present invention, the center of gravity is very close to the centerline of the lowest proprotors, and as far as possible from the upper side proprotors. It means, the pitch axis is very close to the lower proprotors centerline as shown in FIG. 34, and for this reason, all the rotors can provide positive thrust during the transition and it guarantees that the aircraft will speed up during the transition and will avoid stall. Due to the uneven weight distribution, the proprotors with higher load may be of bigger diameter and the proprotors with lower load may be of smaller diameter in order to maintain similar disk loading for all proprotors in hover mode. It is also possible to compensate the higher disk loading by increasing the thrust for example by working at higher proprotor speed and/or higher blade pitch.

In patent No. US 2017/0158312 A1 dated Jun. 8, 2017 by Mark R. Alber, Rotor Blown Wings (RBW) for an aircraft have been described for 2 wings connected to 2 sides of the fuselage in a tail-less VTOL aircraft. The solution disclosed by Sikorsky is very helpful for providing vectored longitudinal forces in forward and backward directions to the wings in hover mode without pitching the plane fuselage. However, in case of the present invention, rotor blown vertical wings are an important part of rotor blown nonplanar wing. In embodiments with winglets, C-wing and closed wing configuration, the concept of rotor blown vertical wings (RBVW) is clearly disclosed. Having selectively controlled control surfaces on RBVWs can provide controlled lateral movements in hover mode. Also vertical to horizontal transition assist force vectors may be provided by Rotor Blown horizontal stabilizer's elevators (A rotor blown tail), or Rotor blown rear wings on a tandem or tandem closed wing configuration. It is possible to force roll the whole aircraft to sides in hover mode by a rotor blown vertical stabilizer's rudder (Rotor blown tail). In the meantime, as will be described In the methods of control, during the hover at the time of speeding up for transition, a rotor blown elevator, when creating negative lift, can keep the aircraft tail down, and prevent it from flapping or being lifted due to the moment created by the effect of the front facing winds on the wings and tail and provide better stability. None of these concepts are available in the patents of Sikorsky Aircraft Corporation. Combination of Rotor Blown wings, Rotor blown rear wings, Rotor blown vertical wings, and Rotor blown tails, provide high precision hover control by applying responsive controlled force vectors in select directions without rolling the whole aircraft like a traditional multicopter.

The present invention has an embodiment of the C-wing combination that has one hinge between the vertical and horizontal parts of each wing, and may convert to a plain-wing aircraft which may have upward swept winglets during the cruise mode and provides a high span wing for better power efficiency during cruise. Patent No. U.S. Pat. No. 9,550,567B1 by Jack Erdozain may look to have a similar approach. However, the Amazon solution has distinguishable differences. In amazon approach, the wings fold down, while in the present invention, the wings fold up (in relation to the flight directional axis). Similar to the other cited patents; Amazon approach tries to keep the CG in the center of the rotors, while in the present invention the CG is as described in FIG. 34, and may even be shifted out of the area covered by the proprotors during the transition. And finally, during the transition, the amazon solution relies on the aircraft momentum which is acceptable for a UAV. However, for a manned aircraft it is not safe to rely on the momentum. In the present invention, the weight is carried by the rotor blown wings, and instead of quick maneuver, there are 2 approaches available to unfold the wings. The first approach is an aircraft which has enough lift to travel with folded wings (C-wing configuration) in airplane mode and the wings are unfolded during or after transition. In this case, the unfolding is only done to increase the wingspan and reduce the wing loading. The other approach is gradual conversion where as a result, the rotor blown induced lift is gradually increased while the wings gradually converts from a C-wing configuration to a plain long wingspan configuration during transition from vertical to horizontal. In case of both approaches, the transition may not be required for low payloads.

Detailed Description of the Embodiments

The subject of the present invention is intended to be capable of takeoff, hover and landing with high precision control, and at the meantime to be efficient in airplane mode. According to "Highly Nonplanar Lifting Systems" paper by, Ilan Kroo, Stanford University, John McMasters, Boeing Commercial Airplane Group, and Stephen C. Smith, NASA Ames Research Center; select nonplanar wing configuration, can provide considerably higher span efficiencies comparing with classic cantilevered wings. Considering a classic cantilevered wing to have span efficiency of 1, with reference to the drawings, and with a height to span ratio of 0.2, a box wing which corresponds to 1A, 1B, 1C, 1D, 1E, 1F has a span efficiency of 1.46, a c-wing in reference to 2A,2D, 2E has a span efficiency of 1.45, and a no winglet c-wing 2F,2G,2H,2J,2K has a span efficiency of 1.41.

Figure 26:
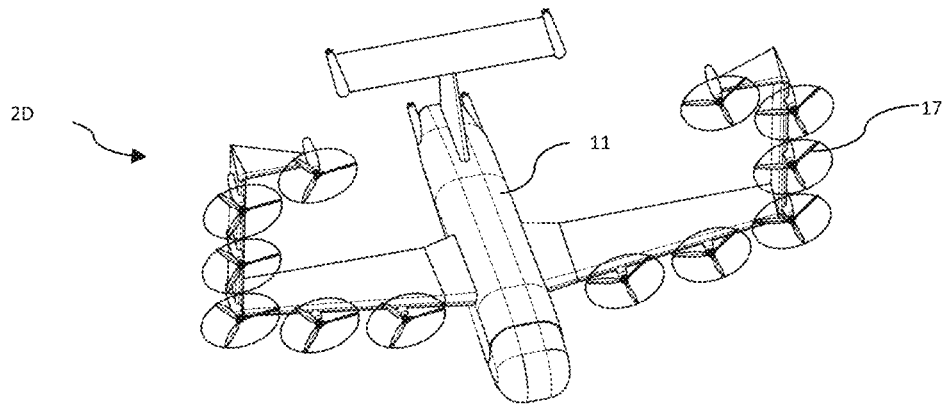
FIG. 26, is a perspective view of an embodiment of a tail sitting VTOL with rotor blown c-wing configuration and multiple small proprotors connected to the wings and corners of the wing assembly in airplane mode. Selectively controlled control surfaces are not shown in this figure.
Figure 27:
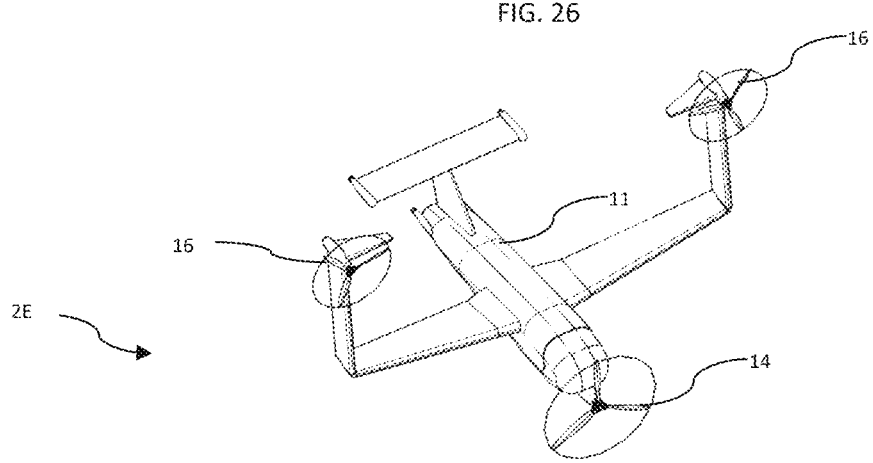
FIG. 27, is a perspective view of an embodiment of a tail sitting VTOL with rotor blown c-wing configuration in airplane mode with 2 proprotors connected to the 2 wings, and 1 proprotors connected to fuselage. Exemplary control surfaces are not shown in this figure.

In the meantime, Nonplanar wing configurations by nature provide structures those are suitable to be used as a base frame for a multirotor aircraft. At least 3-4 proprotors can be connected to such structures in proper configurations for an efficient multirotor operation. Technically when a rectangular frame is presented, it is possible to connect even more than 4 proprotors and logically the number can be increased by using smaller proprotors. Embodiments 1E in FIGS. 11 and 2D in FIG. 26 illustrate the solution with multiple small proprotors those are much more efficient in airplane mode and still can generate and direct air around rotor blown wings for proper control in hover mode. NASA is using multiple small propellers with electric motors for NASA's project X-57 Electric Research Plane, and NASA's aeronautical innovators believe and are trying to validate the idea that distributing electric power across a number of motors integrated with an aircraft in this way will result in a five-time reduction in the energy required for a private plane to cruise at 175 mph."

Combination of nonplanar wing configurations with proprotors, by nature provides the opportunity to have multiple rotor-blown selectively controlled control surfaces and rotor blown wings in different planes and directions. Having selectively controlled control surfaces on vertical blown wings, provides the possibility of lateral movements without rolling the whole body.

One of the most important benefits of the nonplanar rotor-blown wings, emerges during the transition. During the transition, as the aircraft pitches down/forward, the vertical lift component of the proprotors dramatically drops, while the front facing air flow is not capable of creating any lift unless the angle of attack drops to an amount lower than the critical angle of attack of the wings. However, during the same process, the rotor blown wing lift component in vertical direction, is increased and acts as compensation against the decrease in the proprotor component of lift.

A standard method of numbering is used for all the drawings. As a utility application, the focus is on the type and application of the components, and not the design of the aircraft and each component. For this reason, each type of component has the same number in different embodiments based on its application and regardless of the design of the whole aircraft. For example, a right rotor blown vertical wing is numbered 33 in all the embodiments, while a left rotor blown vertical wing is referenced as number 34, and the selectively controlled control surfaces of these vertical rotor-blown wings are numbered 43 and 44 respectively.

As numberings are shown in FIG. 14 to FIG. 17, a tail sitting VTOL with nonplanar tandem rotor blown wing configuration preferably has a fuselage 11, each fuselage 11 having a nose 18 defining the forward direction of the flight in airplane mode, a bottom side 20 defining the forward direction of the flight in hover mode, a top side 21, a right side 22, a left side 23 and a rear 19. The fuselage 11 shown on this document has a lift body design, but the present invention is not limited to a lift body design fuselage only.

Figure 11:
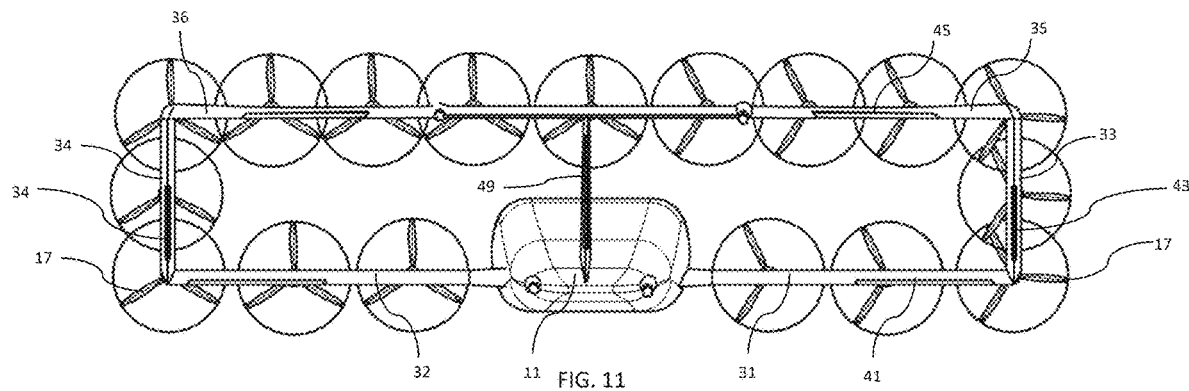
FIG. 11, is a bottom view of an embodiment of a tail sitting VTOL with rotor blown closed wing configuration in hover mode with multiple small proprotors connected to the closed wing frame. Exemplary rotor blown control surfaces are shown on the vertical and horizontal rotor blown wings and the secondary rear rotor blown wings.
Figure 12:
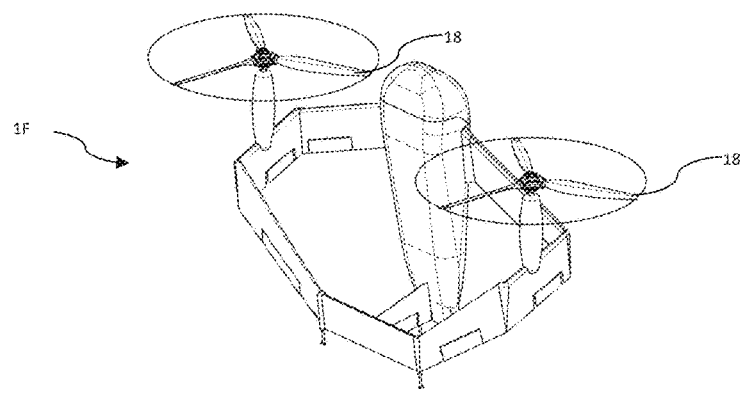
FIG. 12, is a perspective view of an embodiment of a tail sitting VTOL with rotor blown closed wing configuration in hover mode with 2 proprotors connected to the closed wing frame. Exemplary rotor blown control surfaces are shown on the vertical and horizontal rotor blown wings and the secondary rear rotor blown wings.
Figure 13:
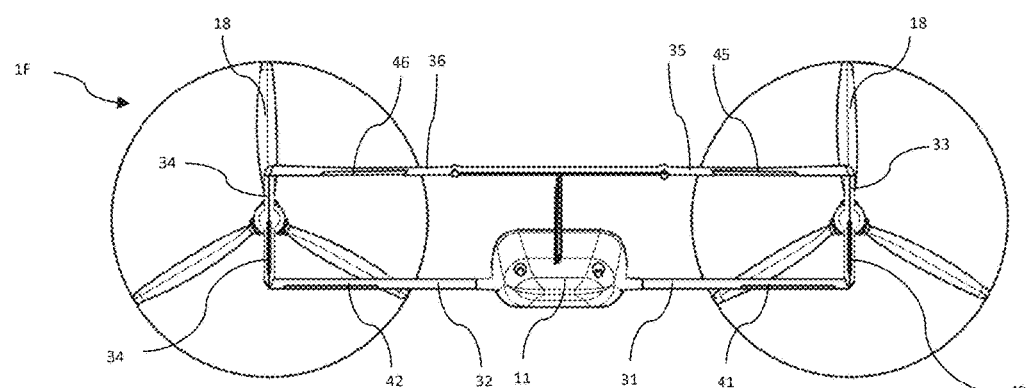
FIG. 13, is a bottom view of an embodiment of a tail sitting VTOL with rotor blown closed wing configuration in hover mode with two big proprotors connected to the closed wing frame. Exemplary rotor blown control surfaces are shown on the vertical and horizontal rotor blown wings and the secondary rear rotor blown wings.
Figure 14:
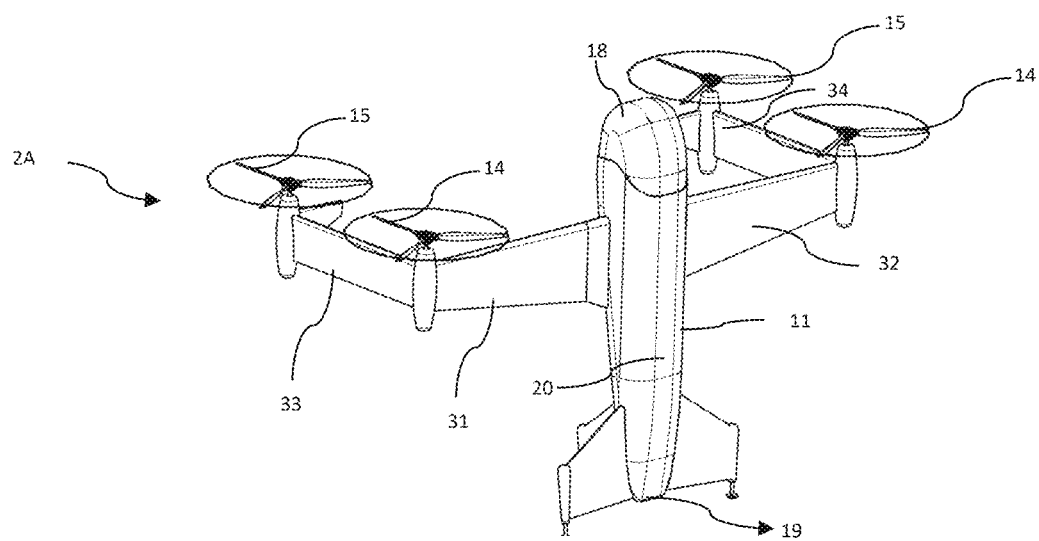
FIG. 14, is an isometric view of an embodiment of a tail sitting VTOL with rotor blown c-wing configuration and 4 proprotors connected to the corners of the wing assembly with the fuselage vertical to the horizon for takeoff, landing and hover. The type of the portrayed tail is not a part of the present invention, and the portrayed embodiment is focused on the rotor blown wing configuration.
Figure 15:
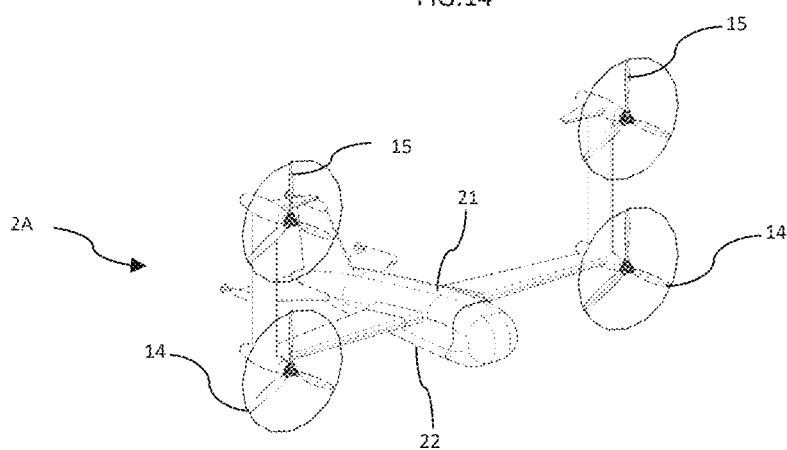
FIG. 15, is an isometric view of an embodiment of a tail sitting VTOL with rotor blown c-wing configuration and 4 proprotors connected to the corners of the wing assembly in airplane mode. Selectively controlled control surfaces are not shown in this figure.
Figure 16:
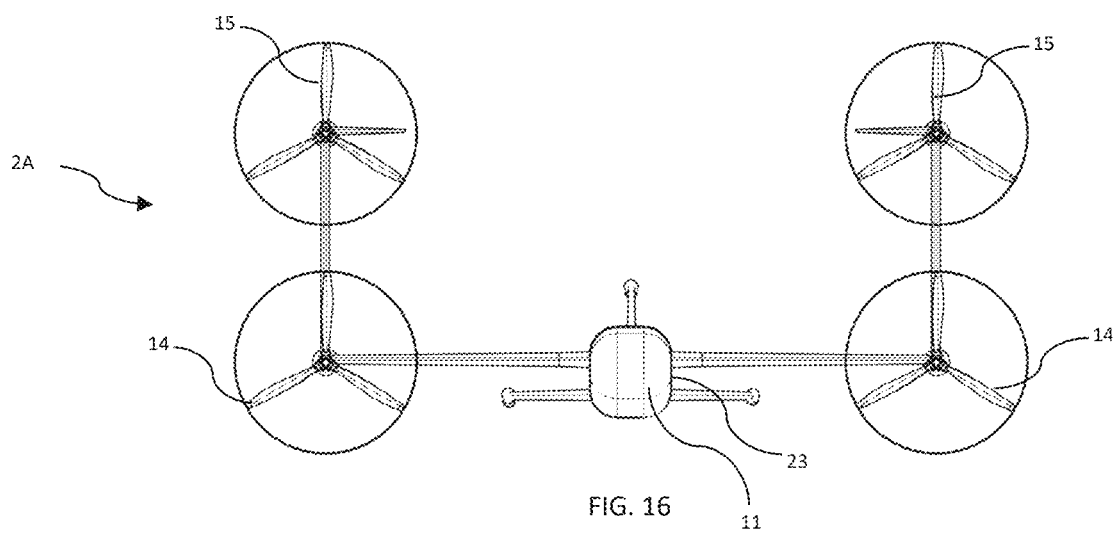
FIG. 16, is a front view of an embodiment of a tail sitting VTOL with rotor blown c-wing configuration and 4 proprotors connected to the corners of the wing assembly in airplane mode. Selectively controlled control surfaces are not shown in this figure.
Figure 17:
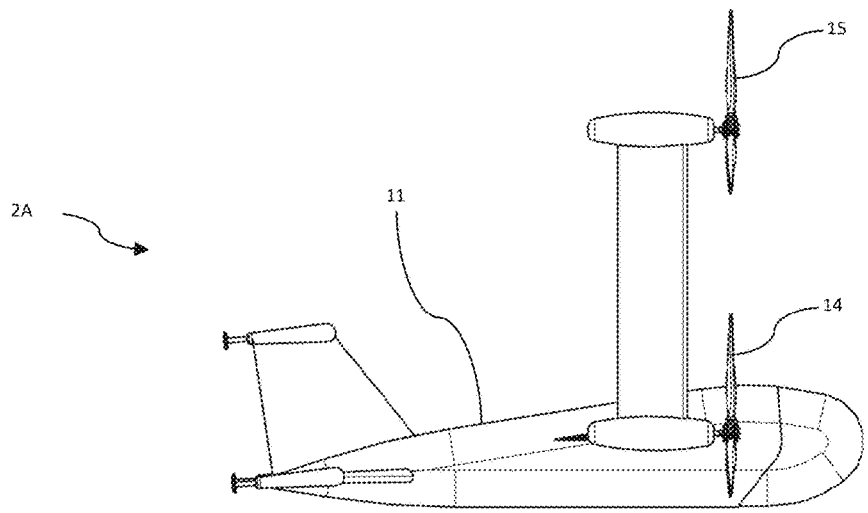
FIG. 17, is a side view of an embodiment of a tail sitting VTOL with rotor blown c-wing configuration and 4 proprotors connected to the corners of the wing assembly in airplane mode. Selectively controlled control surfaces are not shown in this figure.
Figure 18:
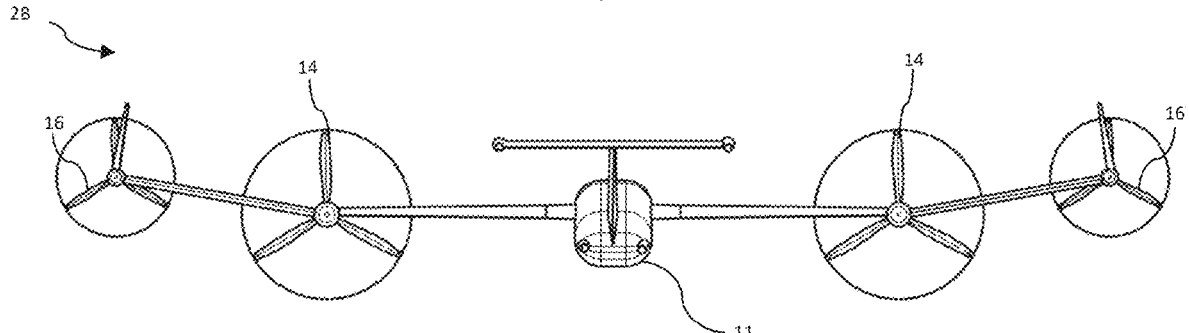
FIG. 18, is a rear view of an embodiment of a tail sitting VTOL with hinged rotor blown c-wing configuration and 4 proprotors connected to the corners of the wing assembly in airplane mode with the second parts of the wings nearly 80 degrees rotated and positioned with a dihedral angle. Selectively controlled control surfaces are not shown in this figure.
Figure 19:
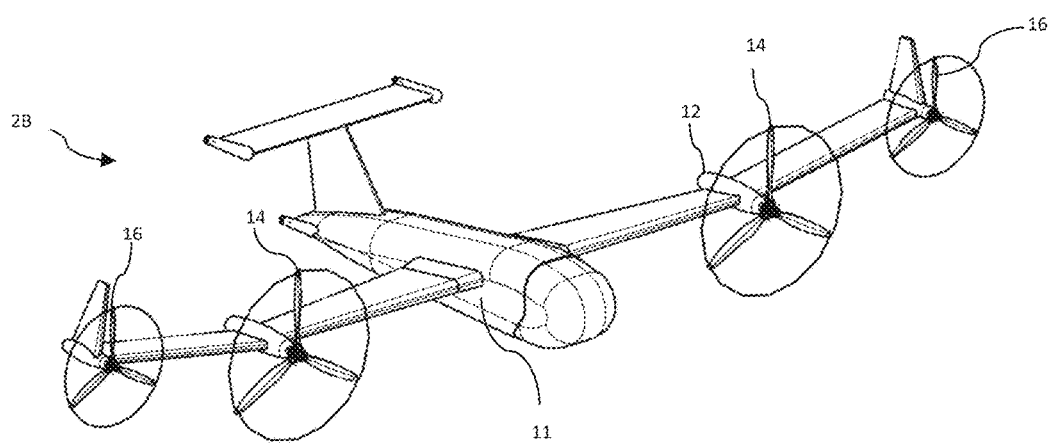
FIG. 19, is a perspective view of an embodiment of a tail sitting VTOL with hinged rotor blown c-wing configuration and 4 proprotors connected to the corners of the wing assembly in airplane mode with the second parts of the wings nearly 80 degrees rotated and positioned with a dihedral angle. Selectively controlled control surfaces are not shown in this figure.
Figure 20:
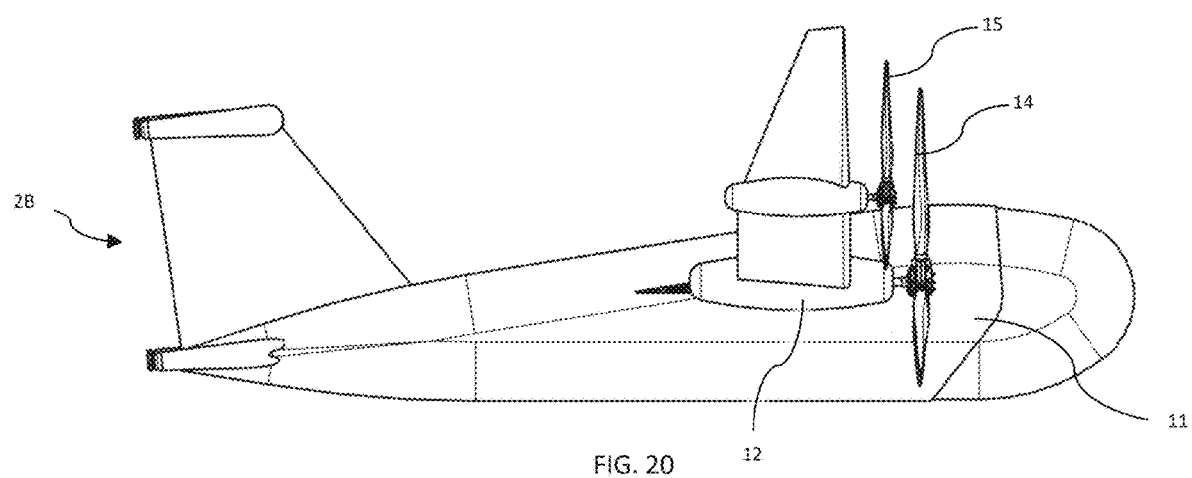
FIG. 20, is a side view of an embodiment of a tail sitting VTOL with hinged rotor blown c-wing configuration and 4 proprotors connected to the corners of the wing assembly in airplane mode with the second parts of the wings nearly 80 degrees rotated and positioned with a dihedral angle. Selectively controlled control surfaces are not shown in this figure.
Figure 21:
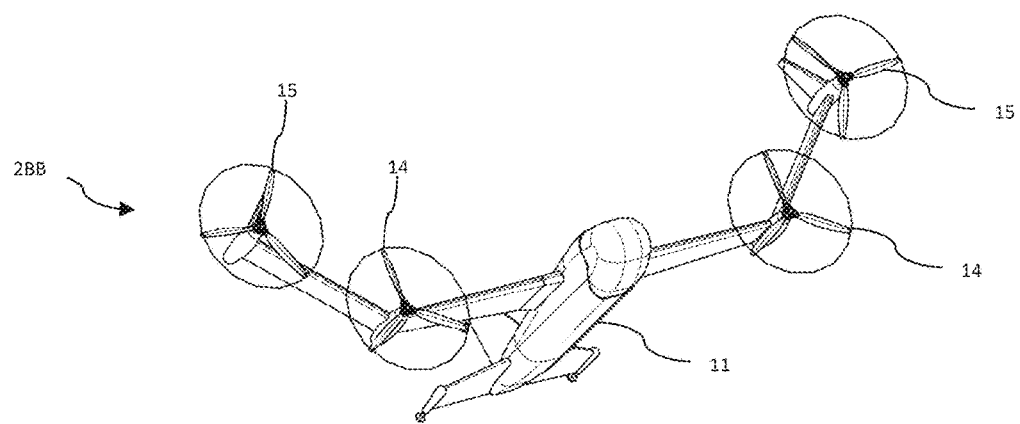
FIG. 21, is a perspective view of an embodiment of a tail sitting VTOL with hinged rotor blown c-wing configuration and 4 proprotors connected to the corners of the wing assembly during transition with semi extracted wings. Selectively controlled control surfaces are not shown in this figure.
Figure 22:
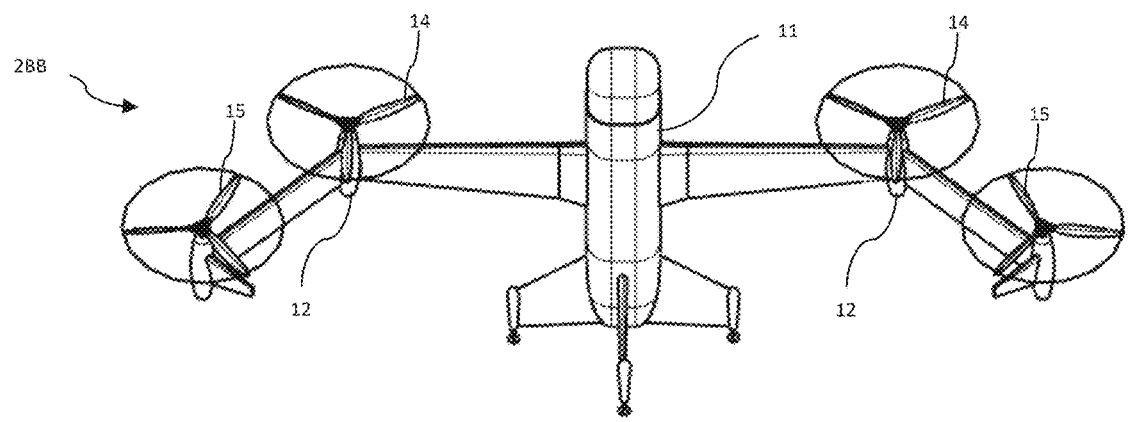
FIG. 22, is a Top view of an embodiment of a tail sitting VTOL with hinged rotor blown c-wing configuration and 4 proprotors connected to the corners of the wing assembly during transition with semi extracted wings. Selectively controlled control surfaces are not shown in this figure.
Figure 23:
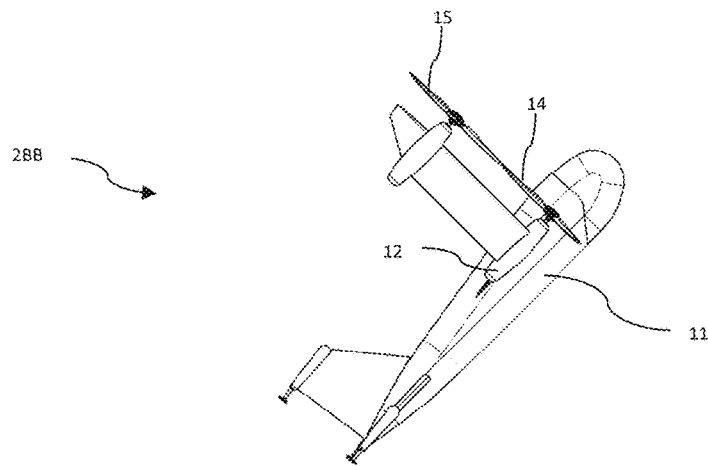
FIG. 23, is a side view of an embodiment of a tail sitting VTOL with hinged rotor blown c-wing configuration and 4 proprotors connected to the corners of the wing assembly during transition with semi extracted wings. Selectively controlled control surfaces are not shown in this figure.
Figure 24:
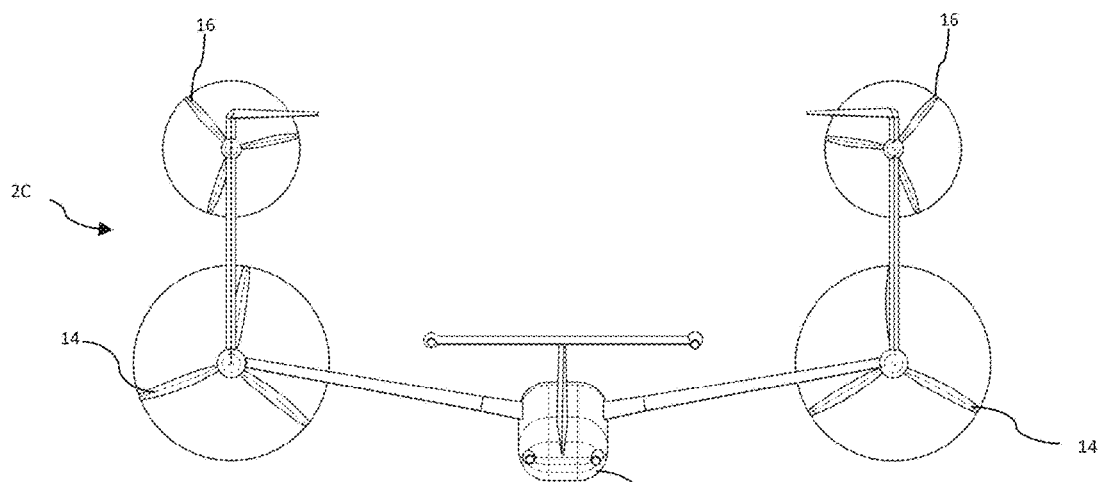
FIG. 24, is a back view of an embodiment of a tail sitting VTOL with hinged rotor blown c-wing configuration and 4 proprotors connected to the corners of the wing assembly in airplane mode characterized by having dihedral first wing part. Selectively controlled control surfaces are not shown in this figure.
Figure 25:
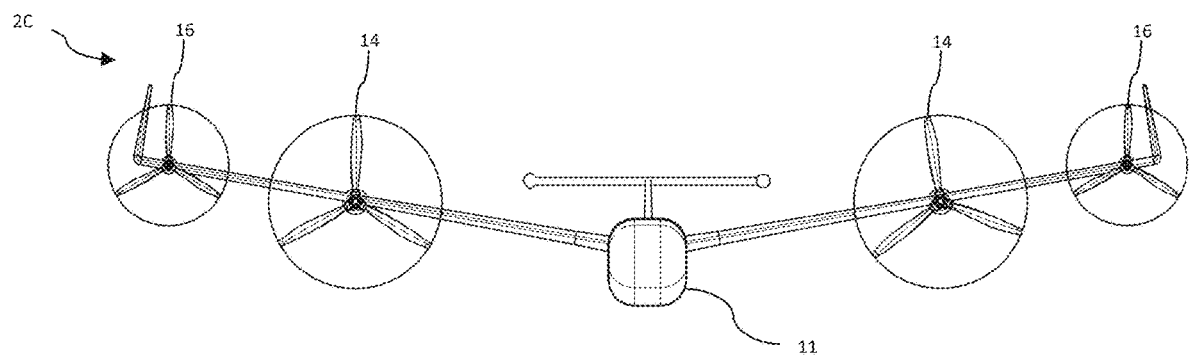
FIG. 25, is a front view of an embodiment of a tail sitting VTOL with hinged rotor blown c-wing configuration and 4 proprotors connected to the corners of the wing assembly in airplane mode characterized by having dihedral first wing part and having the second part of the wing rotated to become parallel to the first part of the wing. Selectively controlled control surfaces are not shown in this figure.

The aircraft may have at least 3 proprotors those may be in different heights in airplane mode including the lower proprotors 14 on the main wings, and higher proprotors 15, connected to the aircraft in a non-linear configuration in order to be capable to drive the aircraft as a multirotor in hover mode. Some of the embodiments (e.g. 2B), may have 2 sizes of proprotors, with bigger load carrying proprotors 14 having bigger diameter, and transition assist smaller proprotors 16 having lower power motors and smaller diameter. The number and position of the proprotors is not limited by the figures. FIG. 11 and FIG. 26 show embodiments with various smaller proprotors 17. Regarding the numbering it should be clarified that number 14 refers to medium proprotors on the main wings, 15 refers to medium proprotors mounted on higher height for multirotor control, 16 refers to small proprotors mounted on higher height for multirotor control, 17 refers to extra small proprotors, and 18 refers to big proprotors. Therefore, the proprotors 15 and 16 have exactly the same application with the only difference being the diameter.

The numbering of the wings and control surfaces follows a standard set of rules: In all the embodiments, an aircraft has a first right wing 31, which may have selectively controlled control surfaces 41, and a first Left wing 32, which may have selectively controlled control surfaces 42. Some embodiments may have a right vertical wing 33 connected to the first right wing 31, which may have selectively controlled control surfaces 43, and a left vertical wing 34, connected to the left wing 32, which may have selectively controlled control surfaces 44. Some embodiments may have a secondary right wing 35, which may have selectively controlled control surfaces 45, preferably connected to the airplane in a way to form a closed wing configuration on the right, and a secondary left wing 36, which may have selectively controlled control surfaces 46, preferably connected to the airplane in a way to form a closed wing configuration on the left. The wing assembly may have right and left winglets to be numbered respectively 37R and 37L which may have control surfaces 47R and 47L respectively, a tail which may have a single piece stabilizer 38, or a right stabilizer 38R and a left stabilizer 38L, those may have right and left control surfaces to be numbered 48R, and 48L respectively. The aircraft may have at least one vertical stabilizer 39, which may have control surfaces 49.

The control surfaces may not be shown in some of the figures when the figure is illustrated to show only the wings set-up or the overall set-up of an aircraft. Control surfaces may include but are not limited to surfaces such as ailerons, rudders, elevators, flaps, slats, spoilers, air brakes, and trim tabs. However, in the figures, only ailerons, elevators and rudders are shown in order to make the demonstration simpler. The control surfaces may be on the top, bottom, leading edge or trailing edge of the wings. The numbering of the control surfaces as described above includes: Control surfaces of the right wing 41, control surfaces of the left wing 42, control surfaces of the right vertical wing 43, control surfaces of the left vertical wing 44, control surfaces of the second right wing (rear wings in closed wing configuration) 45, control surfaces of the second left wing (rear wings in closed wing configuration) 46, Control surfaces of the right winglet 47R and control surfaces of the left winglet 47L, right and left horizontal stabilizer control surfaces 48R, 48L (e.g. elevator), Control surfaces of the fin 49 (e.g. rudder).

In order to demonstrate a C-wing with multirotor configuration, a tail sitting VTOL aircraft with rotor blown nonplanar wings configuration in accordance with an exemplary embodiment is indicated generally at 2A in FIG. 14 to FIG. 17. The illustrated embodiment has a multirotor-rotor blown C-wing configuration but does not present a rotor blown tail. C-wing aircraft includes a fuselage 11, a right wing assembly and a left wing assembly. The right wing assembly includes a nearly horizontal wing 31 which may have an anhedral or a dihedral angle, a nearly vertical wing 33 and an optional nearly horizontal winglet 37R. The left wing assembly includes a nearly horizontal wing 32 which may have an anhedral or a dihedral angle, a nearly vertical wing 34 and an optional nearly horizontal winglet 37L. 4 proprotors 14, 15 are connected to the wing assembly in a quadrilateral configuration. The proprotors 14, 15 may be connected close to the corners of the wing assembly. Corner of the wing assembly is referred to the point where the vertical and horizontal wings are connected. However, a quadrilateral shape can be created by connecting the proprotors at any point on the wing assembly. Connection to the corners, or closest possible to the corners provides bigger area covered by the proprotors which can lead to better controllability and thus is preferred.

A tail sitting VTOL aircraft with rotor blown nonplanar wings configuration in accordance with an exemplary embodiment is indicated generally at 2B and 2BB in FIG. 18 to FIG. 23. It's essentially the same as the aircraft 2A, but instead of the first and second wings to be fixed related to each other, they are hinged together. On the illustrated figures, the hinge is concentric with a nacelle 12, but it is possible to have a hinge between to wings and mount the nacelle on one of the wings only. 2B also illustrates the possibility of having two different sizes of proprotors while 2BB illustrates identical proprotors. 2BB is shown during transition while the hinged portions of the wings including the vertical parts 33, 34 and the winglets 37L, 37R are rotated around the axis of the hinges for about 45 degrees.

Embodiments 2F, 2G, 2H, 2J and 2K, all have a configuration which is similar to C-wing configuration but without the winglets at the end tip of the vertical wings. In order to avoid complications, this set-up will be called U-wing configuration in this document.

Figure 28:
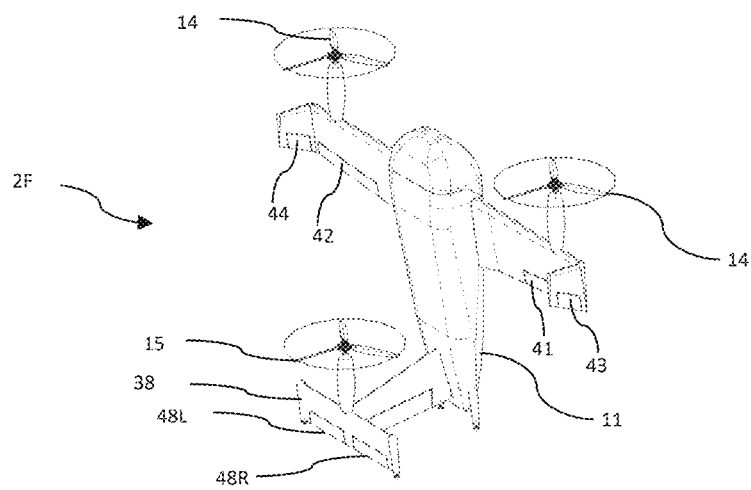
FIG. 28, is a perspective view of an embodiment of a tail sitting VTOL with rotor blown horizontal and vertical wings in hover mode with 2 proprotors connected to the rotor blown wings, and 1 proprotors connected to the rotor blown tail. Exemplary control surfaces are shown on the vertical and horizontal wings and the tail assembly.

A tail sitting VTOL aircraft with rotor blown nonplanar wings configuration in accordance with an exemplary embodiment is indicated generally at 2F in FIG. 28. The exemplary embodiment discloses the possibility of having a rotor-blown tail. The illustrated embodiment presents both rotor blown horizontal stabilizers and rotor blown vertical stabilizers. Even since the concept of a rotor blown tail is illustrated with only one proprotor 15, it should be readily understood that the disclosure is not limited to this embodiment only. The illustrated embodiment acts as a tricopter during the hover.

The effect of the torque of the motors is compensated on quadcopters and in general multicopters with identical pairs of rotors. However, odd number of proprotors and/or unequal sizes of proprotors cause torque induced control issues in hover mode. The 3 rotor embodiment shown as 1C, 2E, and 2F, and embodiments with unequal proprotor diameters 1A, 2B, 2C, 2H and 2J all may suffer from uncompensated moment applied by the proprotors to the aircraft during hover mode. In order to compensate the resulted moment, all or a portion of the sum of the moments applied by the proprotors in hover mode, may be compensated by applying opposite lift vectors on the rotor blown tail stabilizer by means of control surfaces 48R and 48L. In the meantime, all or a portion of the sum of the moments of the proprotors in hover mode, may be compensated by applying opposite lift vectors on the rotor blown wings 31 and 32 and in some embodiments 35 and 36 by means of control surfaces 41, 42, 45, and 46.

A tail sitting VTOL aircraft with rotor blown nonplanar wings configuration in accordance with an exemplary embodiment is indicated generally at 2G in FIG. 29. The exemplary embodiment discloses the possibility of having a rotor blown tail with 2 proprotors 15. The illustrated embodiment presents both rotor blown horizontal stabilizers and rotor blown vertical stabilizers. It should be readily understood that the disclosure is not limited to this embodiment only.

Figure 30:
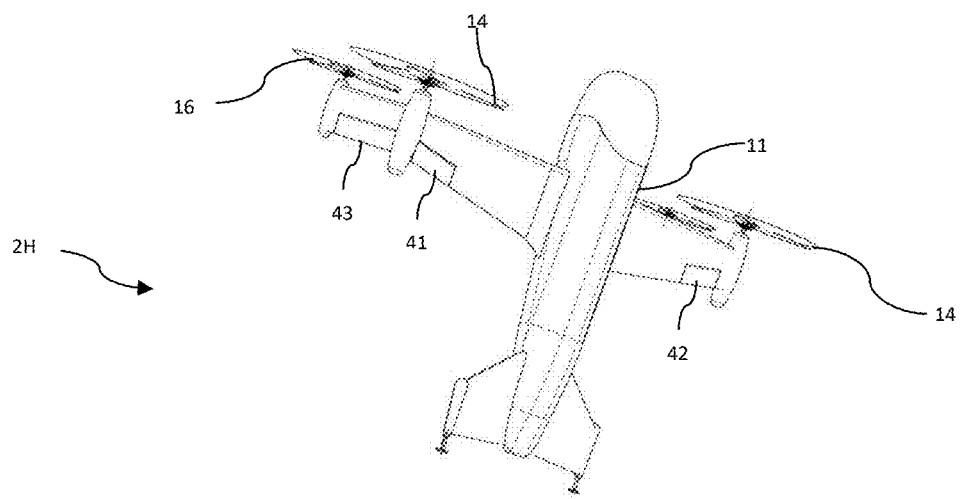
FIG. 30, is a perspective view of an embodiment of a tail sitting VTOL with rotor blown C-wing configuration and rotor blown horizontal and vertical wings in hover mode with 4 proprotors connected to the corners of the C-wing configuration. It is differentiated from FIG. 1 to FIG. 13 by shorter vertical part which results in overlapping of the streamtube of 2 proprotors on each side. The rotor discs are on different planes in order to avoid collision between the blades of each set of proprotors blades on each side.

A tail sitting VTOL aircraft with rotor blown nonplanar wings configuration in accordance with an exemplary embodiment is indicated generally at 2H in FIG. 30. The exemplary embodiment discloses the possibility of having 2 sets of proprotors with overlapping streamtubes. The proprotor disks are located in different planes in order to prevent collision between the blades. It should be readily understood that the disclosure is not limited to this embodiment only.

Figure 31:
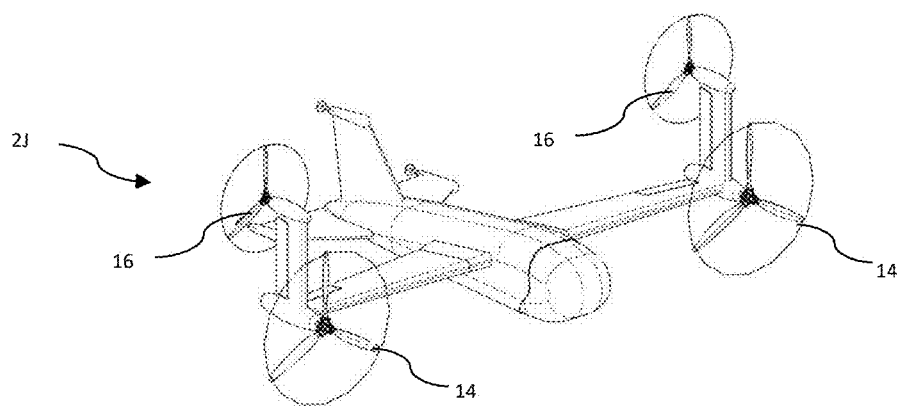
FIG. 31, is a perspective view of an embodiment of a tail sitting VTOL with rotor blown C-wing configuration and rotor blown horizontal and vertical wings in airplane mode with 4 proprotors connected to the corners of the C-wing configuration. This figure discloses the possibility of having rotors in pusher mode.
Figure 32:
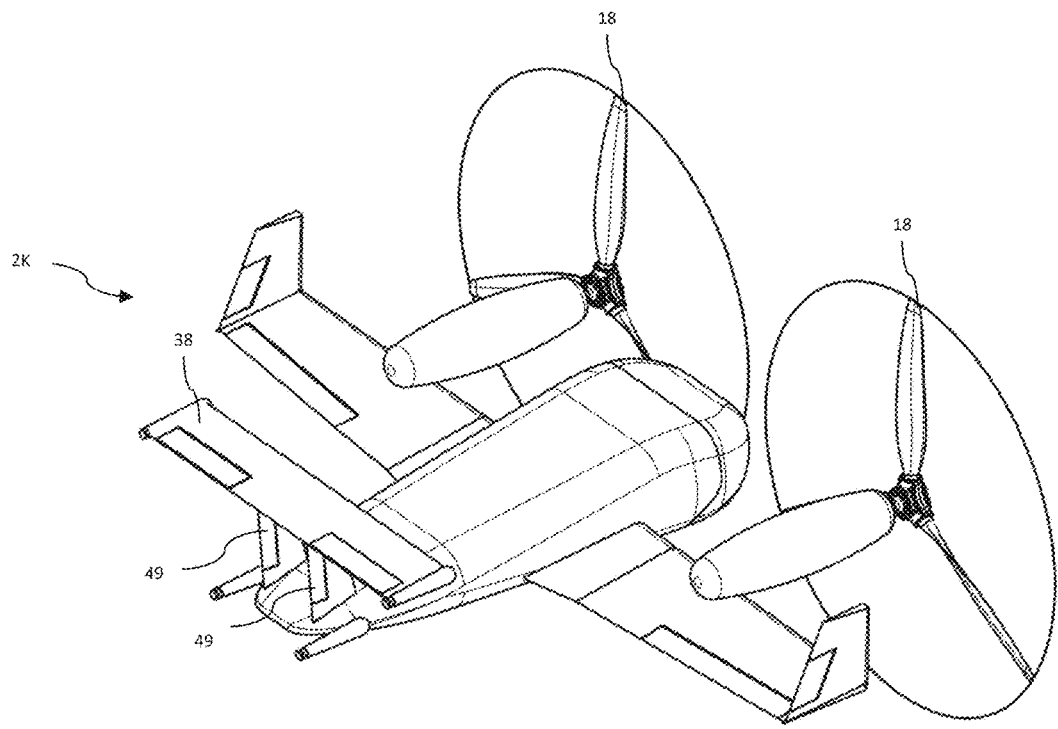
FIG. 32, is a perspective view of an embodiment of a tail sitting VTOL with rotor blown horizontal and vertical wings in airplane mode with 2 big proprotors connected to the rotor blown wings. Exemplary control surfaces are shown on the vertical and horizontal wings and the tail assembly.

A tail sitting VTOL aircraft with rotor blown nonplanar wings configuration in accordance with an exemplary embodiment is indicated generally at 2J in FIG. 31. The exemplary embodiment discloses the possibility of having pusher proprotors on aircraft with rotor blown nonplanar wings configuration. It should be readily understood that the disclosure is not limited to this embodiment only.

Figure 2:
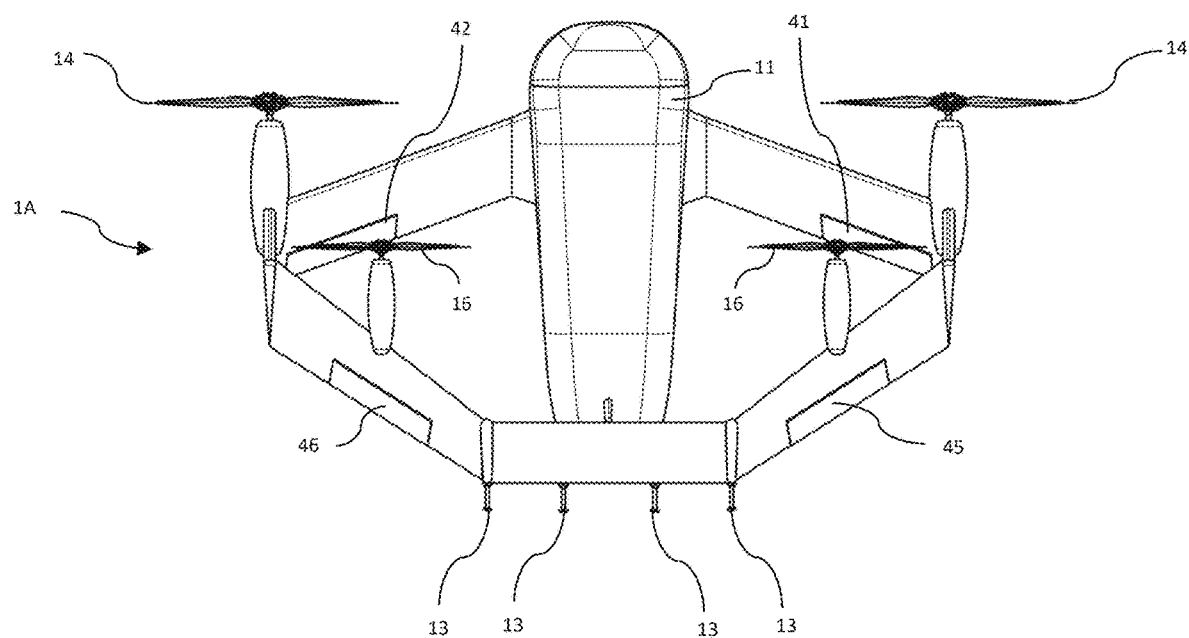
FIG. 2, is a back view of an embodiment of a tail sitting VTOL with rotor blown closed wing configuration in hover mode with 4 proprotors connected to the closed wing frame. The proprotors connected to the first pair of wings are bigger and the proprotors connected to the second pair of wings are smaller. Exemplary control surfaces are shown on the vertical and horizontal wings and the secondary rear wings.
Figure 3:
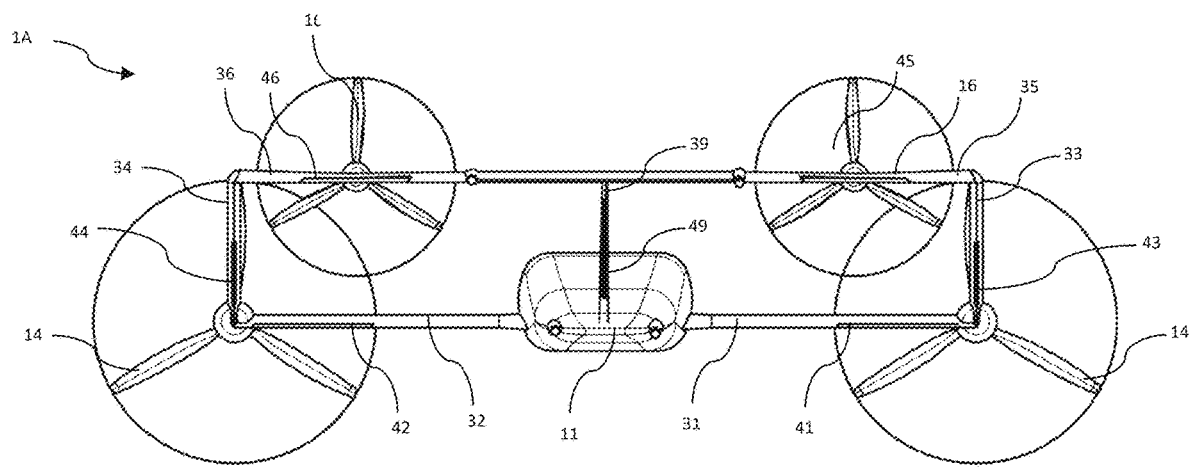
FIG. 3, is a bottom view of an embodiment of a tail sitting VTOL with rotor blown closed wing configuration in hover mode with 4 proprotors connected to the closed wing frame. The proprotors connected to the first pair of wings are bigger and the proprotors connected to the second pair of wings are smaller. Exemplary control surfaces are shown on the vertical and horizontal wings and the secondary rear wings.
Figure 4:
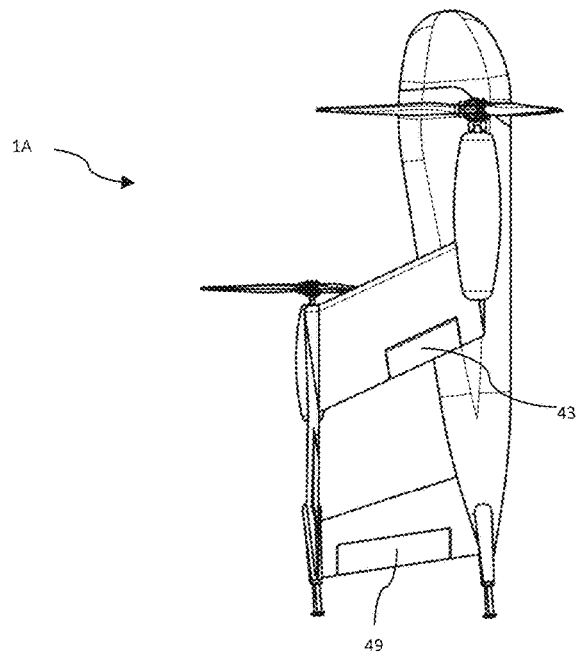
FIG. 4, is a side view of an embodiment of a tail sitting VTOL with rotor blown closed wing configuration in hover mode with 4 proprotors connected to the closed wing frame. The proprotors connected to the first pair of wings are bigger and the proprotors connected to the second pair of wings are smaller. Exemplary control surfaces are shown on the vertical and horizontal wings and the secondary rear wings.
Figure 5:
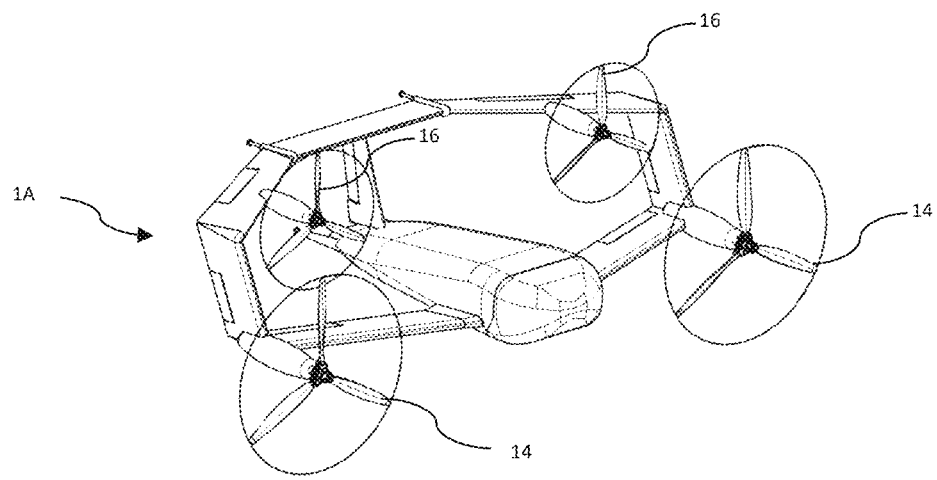
FIG. 5, is a Perspective view of an embodiment of a tail sitting VTOL with rotor blown closed wing configuration in airplane mode with 2 proprotors connected to the front wings, and 2 smaller proprotors connected to the secondary rear wings.
Figure 6:
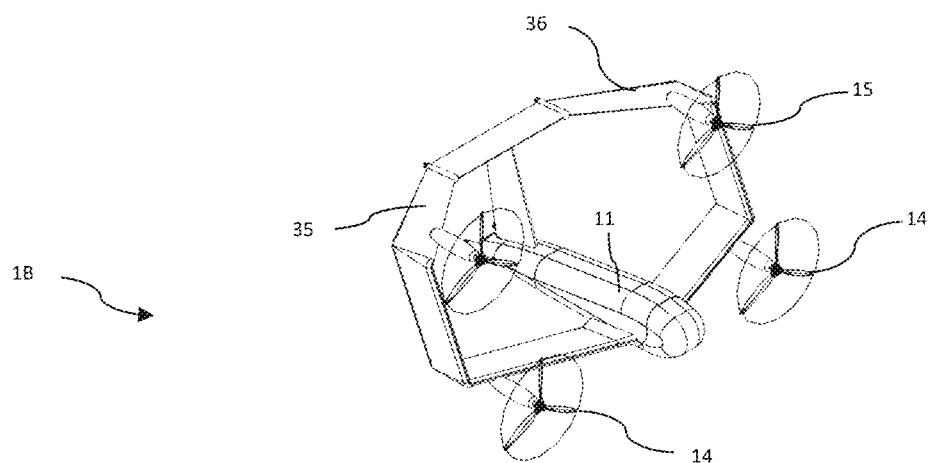
FIG. 6, is a perspective view of an embodiment of a tail sitting VTOL with rotor-blown closed wing configuration in airplane mode with 4 identical proprotors including 2 proprotors connected to the front wings, and 2 proprotors connected to the rear wings. Selectively controlled control surfaces are not shown in this figure.
Figure 7:
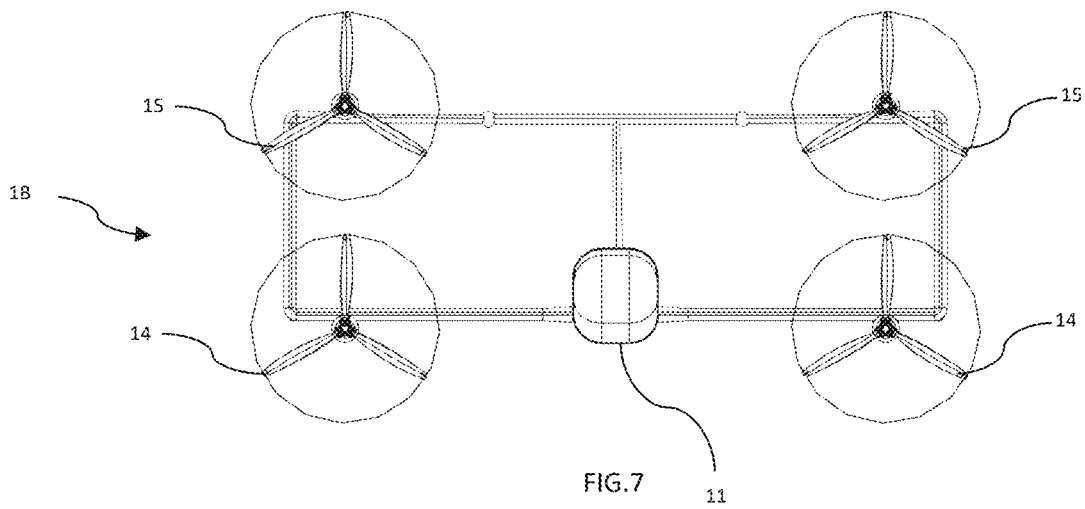
FIG. 7, Is a front view of an embodiment of a tail sitting VTOL with rotor blown closed wing configuration in airplane mode with 4 identical proprotors including 2 proprotors connected to the front wings, and 2 proprotors connected to the rear wings. Selectively controlled control surfaces are not shown in this figure.
Figure 8:
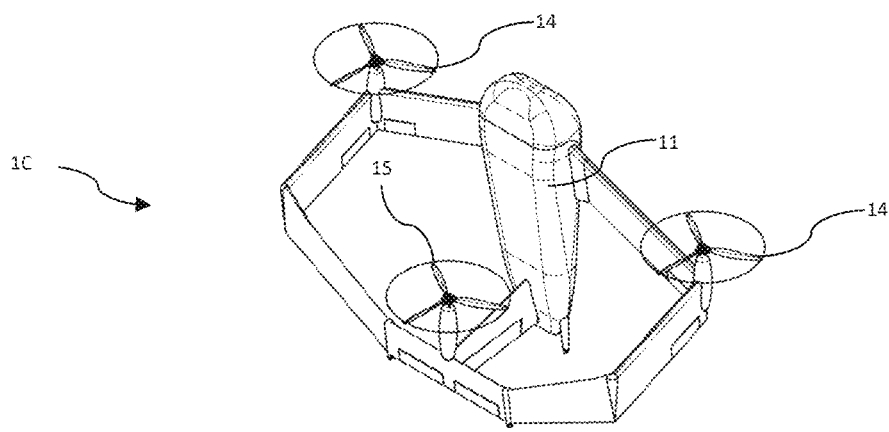
FIG. 8, is a perspective view of an embodiment of a tail sitting VTOL with rotor-blown closed wing configuration in hover mode with 2 proprotors connected to the front wings of the closed wing configuration, and 1 proprotors connected to the rotor blown stabilizers. Exemplary control surfaces are shown on the rotor blown airfoil-shaped cross section bodies.
Figure 9:
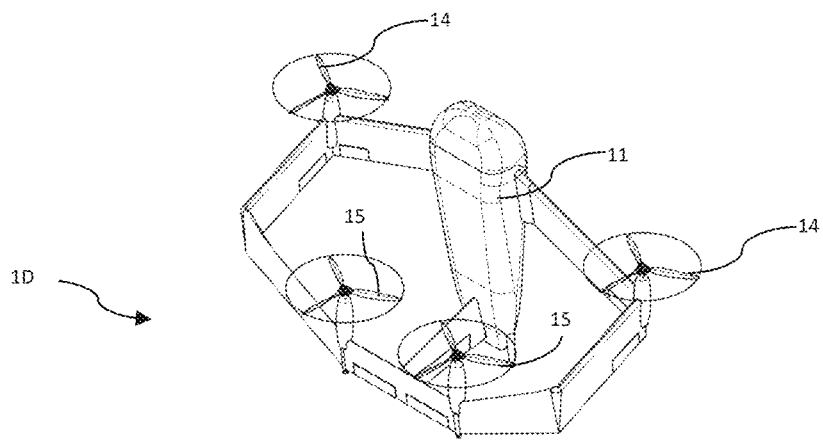
FIG. 9, is a perspective view of an embodiment of a tail sitting VTOL with rotor-blown closed wing configuration in hover mode with 2 proprotors connected to the front wings of the closed wing configuration, and 2 proprotors connected to the blown stabilizers and rear rotor-blown wings. Exemplary control surfaces are shown on the vertical and horizontal wings and the tail assembly.
Figure 10:
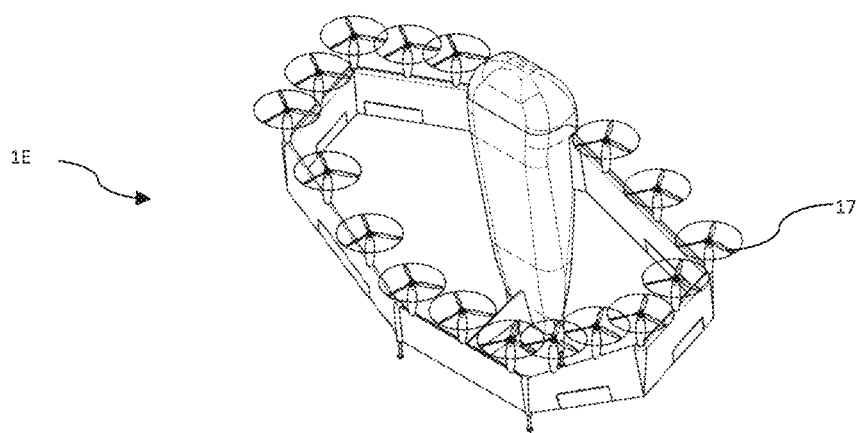
FIG. 10, is a perspective view of an embodiment of a tail sitting VTOL with rotor-blown closed wing configuration in hover mode with multiple small proprotors connected to the closed wing frame. Exemplary rotor blown control surfaces are shown on the vertical and horizontal rotor blown wings and the secondary rear rotor blown wings.

A tail sitting VTOL aircraft with rotor blown nonplanar tandem wings configuration in accordance with an exemplary embodiment is indicated generally at 1A in FIG. 1 to FIG. 5. The exemplary illustrated control surfaces are all ailerons, however the phrase "control surfaces" is not limited to ailerons only. A closed wing aircraft includes a fuselage, a right wing assembly and a left wing assembly. The right wing assembly includes a first right wing 31, a nearly vertical wing on the right 33 and a second right wing 35 which is connected in a way to form a closed wing configuration on the right. The left wing assembly includes a first left wing 32, a nearly vertical wing 34 and a second horizontal wing 36 which is connected to the aircraft in a way to form a closed wing configuration on the left. The closed wings 31, 32, 33, 34, 35 and 36 may be straight, swept or curved. The wings 31, 32, 35 or 36 may have a dihedral or anhedral angle. Second wings 35 or 36 may be connected to the fuselage directly, or by at least one fin. The aircraft may have at least one stabilizer (Horizontal or vertical). The horizontal stabilizer may be replaced by rear wings or may be incorporated into the rear wings. When a horizontal stabilizer is incorporated into the rear wing, the rear wing may have a nearly straight section as stabilizer, and a swept or curved section. FIG. 1 to FIG. 13 all include a closed wing tandem configuration which may be used as a base structure to be used to support nacelles and proprotors to form a multicopter in hover mode. The phrase "tandem" is used since two pairs of wings are not stacked on top of each other and one pair is connected closer to the fore of the aircraft and another pair is connected closer to the aft of the aircraft. The closed frame has a quadrilateral shape when viewed from the front view in airplane mode. However, the quadrilateral shape may have sharp corners, or may have fillet or chamfered corners. Having chamfered corners on a closed wing configuration, may convert the front view of the frame in airplane mode from a quadrilateral to an octagon. 4 proprotors 14, 16 are connected to the wing assembly in a quadrilateral configuration. It should be readily understood that the proposed frame, provides no limit for the number of the proprotors. So theoretically a tricopter, a quadcopter, a hexacopter, octocopter and in general every multicopter configuration can be created by connecting the corresponding number of proprotors to the base frame shown in FIG. 1 to FIG. 13. However, it is preferred the create the multirotor aircraft by connecting an even number of proprotors, consisted of pairs of counter rotating proprotors in order to create better control and have compensated motor torque. In a quadrotor configuration, the proprotors 14, 15 or 16 may be connected close to the corners of the wing assembly or at any place on the wings. Corner of the wing assembly is referred to the point where the vertical and horizontal wings are connected. However, a quadrilateral shape for 4 proprotors can be created by connecting the proprotors at any point on the wing assembly in a nonlinear pattern when viewed from the forward extremity of the aircraft. Connection to the corners, or closest possible to the corners is preferred for a quadcopter configuration since this way, the proprotors cover a bigger area in hover mode. As can be seen in FIG. 2 the control surfaces 45 and 46 of the rear wings 35 and 36 actually act as stabilizer control surfaces and are positioned far from the centerline of the aircraft to be distanced from the ground when the aircraft is grounded. It results in avoiding the change of air flow in the proximity of the ground to affect the performance of these control surfaces.

It should be noted that a closed wing configuration, has many sub-classifications those nearly all follow the same concept and have a similar structure which may have differences in shape and angle of the wings, sweep side, dihedral angle, etc. A few known classifications of the closed wing configuration are:

Based on top view shape: Rhomboidal wing, Triangle wing and straight wing

Based on Front view shape: cylindrical wing, annular wing, elliptic wing, box wing, Diamond shape wing, Trapezium-shaped wing, Flat wing, Joined wing with winglets Based on side view: Front wing lower than the rear wing, Front wing higher than the rear wing, wings at the same plane It should be stated that the description mentioned in the last two paragraphs covers all the traditional names. For example, a straight wing configuration with fillets of high radius, can create a annular wing, a curved wing configuration with big fillets can create elliptic wing, and a square shaped wing (front view) with big fillets on the edges converts to a cylindrical wing.

It should be readily understood that combining different nonplanar wing types with different numbers and placement of proprotors, will technically lead to unlimited number of embodiments those will all fall into the category of VTOL aircraft with rotor blown nonplanar wing configuration. However, the present invention is not about design and as a utility application is focused on the novelties described in this application than only a specific design.

Various known closed wing non-planer wing configurations are mentioned in this document, but describing each type is avoided. It is necessary to state that the present invention is not aiming to disclose a new type of closed wing or nonplanar wing, since every type is already invented. However, according to the present invention, basically every kind of nonplanar wing aircraft can provide the base structure to connect at least 1 proprotor to create a tail sitting VTOL with nonplanar tandem rotor blown wing configuration, and 3 or more nonlinear proprotors in order to create a tail sitting VTOL with nonplanar tandem rotor blown wing configuration and multirotor flight capabilities.

Figure 35:
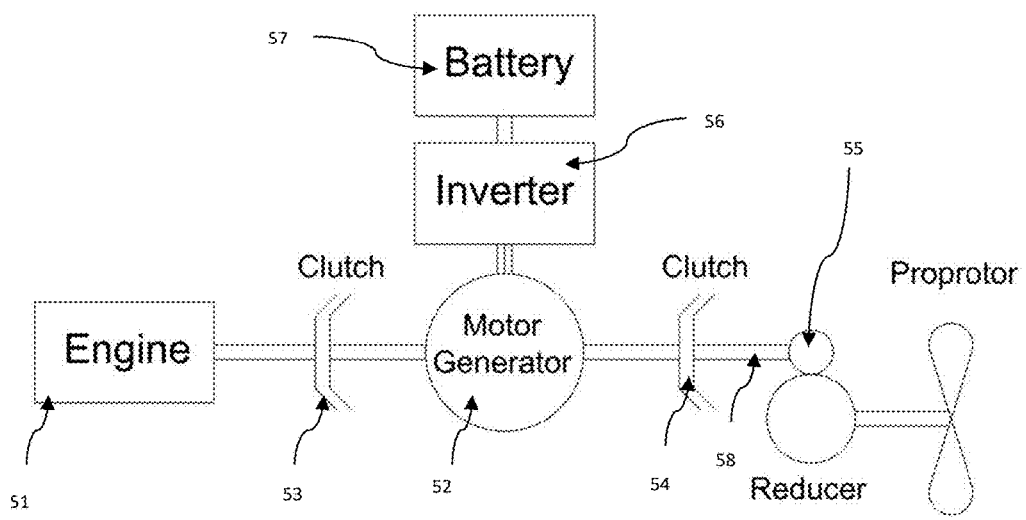
FIG. 35, is a diagram disclosing the in nacelle hybrid solution of the present invention.

Power Saving Novelties:

As an exemplary power saving scenario for a tail sitting VTOL aircraft with nonplanar tandem rotor blown wings configuration; during the takeoff, landing and hover, all the proprotors are operational. During the cruise however, at least 1 proprotor is operational and the rest may be feathered and stop rotating. As an optional exemplary operational scenario, at least one of the feathered proprotors may have hybrid propulsion system as the one shown in FIG. 35 including an engine 51, an electric motor-generator unit 52, an engine disengaging clutch 53, and a proprotor disengaging clutch 54 and an optional reducer 55. The output shaft 58 transmits the power of the hybrid propulsion system to the optional reducer 55. These parts may be located inside a nacelle while the inverter 56 and Batteries 57 may be located inside the nacelles, inside the wings, or fuselage. The hybrid system inside the nacelle of the feathered proprotors may still operate as a power generator during flight while the connected proprotor is stopped, by engaging the engine clutch 53, and disengaging proprotor clutch 54. The clutches may have hydraulic or electric actuators but the type of the clutch is not a subject of the present invention.

As an exemplary power saving scenario, the at least 1 proprotor may have blades optimized for hover, and at least 1 proprotor may have blades optimized for cruise. For example, the bigger proprotors 14 may have blades optimized for hover and be feathered during the cruise, while the smaller proprotors 16 may have blades optimized for cruise. And be operational in all conditions.

Transition Scenarios and Calculations:

An exemplary transition scenario for the transition of the VTOL subject of the present invention is presented with data and a transition strategy for 2 embodiments as following:

Aircraft starts moving in forward direction in hover (i.e. fuselage bottom direction). Positive thrust in the forward direction of flight in hover mode may be created by means of producing negative lift by the rotor blown airfoil-shaped cross section bodies (i.e. wings excluding vertical wings and horizontal stabilizers) by means of the selectively controlled rotor-blown surfaces 41, 42, 45, 46, 48R, and 48L. For example by moving the rotor blown ailerons of the rotor blown wings 31 and 32 upward, when the word upward refers to the direction of the top surface of a wing when the aircraft is in any orientation, negative lift is created, and provides vectored force in the forward direction of flight in hover mode. The rotor blown control surfaces of the tail 48R and 48L may also be positioned to create negative lift in order to provide positive thrust and keep the tail down during hover and prevent the fuselage from flapping or going up due to the moment created by the front facing air flow. For example, elevators of the rotor blown tail may be positioned in order to create negative lift. Positive thrust can also be created by slightly pitching down the aircraft like the method used in traditional multirotors. When the forward speed exceeds the stall speed by a safe margin, for example 40~50%, meaning the hover forward speed is 1.4~1.5 times of the stall speed, the transition may start.

It is possible to perform manual transition by a skilled pilot if the aircraft stands in a safe distance from the ground. However, the transition is safer to be performed by a flight computer. The flight computer gets the data from the aircraft various sensors and continues updating the trim settings and performing stabilization of the aircraft during takeoff, landing, transition and airplane modes. For simplicity, operations related to trim adjustment and stability are not stated in the sequence of the operations related to the transition. During the transition, the flight sensors measure the angle between the flight directional axis of the aircraft and the horizon and adjust the transition strategy accordingly.

In order to perform a safe transition operation, the diagram of the forces should be fully understood. So the following terms are defined:

Considering the proprotors to be substantially parallel to the longitudinal axis of the plane, the pitch angle, the angle between the longitudinal axis of the plane and the ground, is nearly 90 degrees when the proprotors are perpendicular to the horizon in hover mode, and is nearly zero if the longitudinal axis of the plane is parallel to the horizon. At the start of the transition, if the aircraft only relies on rotor blown surfaces, the pitch angle can be 90 degrees. If the aircraft relies on the horizontal components of the proprotors thrust (Like traditional multirotors), the pitch angle may be about 85 degrees (at the start of the transition).

The VTOL aircraft requires maximum lift at the end of the transition. For this reason, at the end of the transition, if the VTOL aircraft trajectory is decided to be parallel to the ground, the pitch angle should be slightly below the critical angle of attack. The critical angle of attack can be increased even up to 25 degrees by use of slats. However, a traditional wing has a critical angle of attack of about 15 degrees. The flight computer calculates the critical angle of attack continuously during the flight, however, in this example, it is considered to be 15 degrees. For this reason, the transition starts at about 85~90 degrees pitch angle, and ends at about 15 degrees.

The components of the forces can be defined as following:

The lift component of the proprotor's thrust=Proprotor's Thrust×Sin (Pitch Angle)

Forward Thrust of the proprotor=Proprotor thrust×cos (Pitch Angle)

The vertical component of the rotor blown wing lift=Blown wing lift×Cos (Pitch Angle)

The forward component of the rotor blown wing lift=−Blown wing lift×Sin (Pitch Angle)

It is necessary to understand that the positive lift created by the wings during the hover is opposite to the direction of flight and acts as braking force.

The vertical component of the non-blown wing lift=wing lift×Cos (Pitch Angle)

The forward component of the non-blown wing lift=−wing lift×Sin (Pitch Angle)

According to the above mentioned formulas, it should be understood that as the pitch angle descends from 90 degrees, the lift component of the proprotor thrust descends too. If we consider the critical angle of attack of the wings to be 15 degrees, when the VTOL aircraft pitch reaches 25 degrees, the lift component of the thrust drops to 42%. At this time, the non-blown wing parts are at stall and their lift is nearly zero since the angle of attack is above 20 degrees and in this example, the created lift is at maximum amount when the angle of attack is around 15 degrees.

Figure 36:
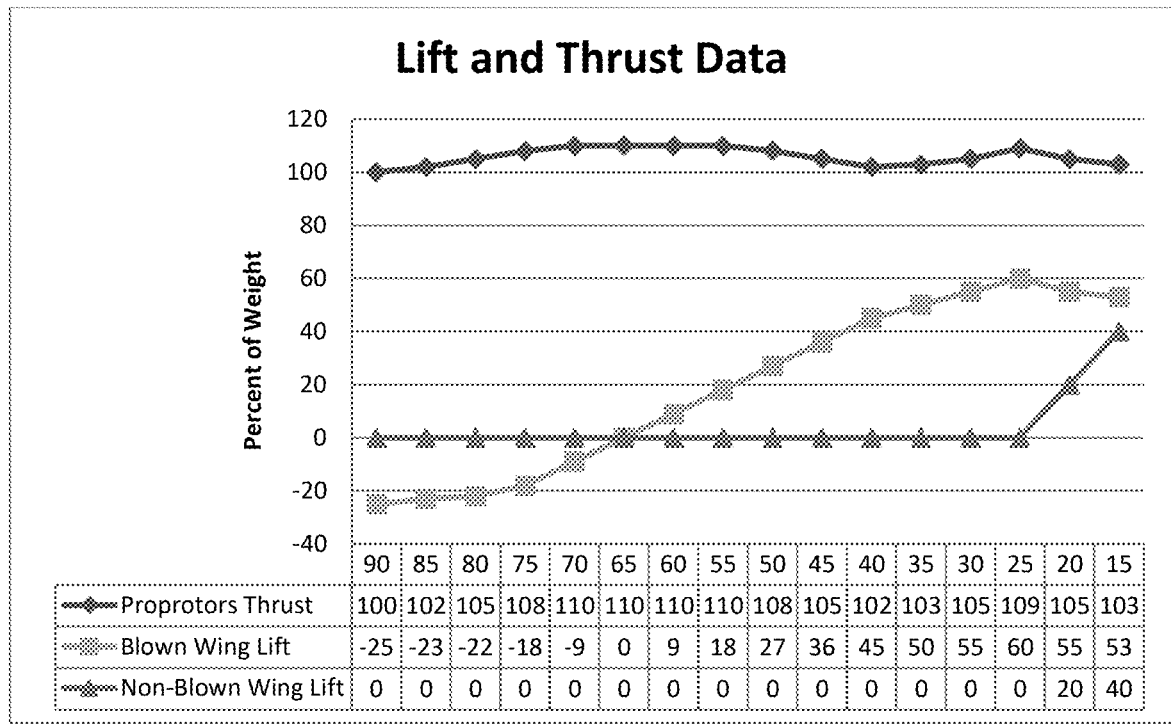
FIG. 36, is a diagram disclosing the net lift and thrust data of proprotors and rotor blown and non-blown wings for an exemplary aircraft.
Figure 37:
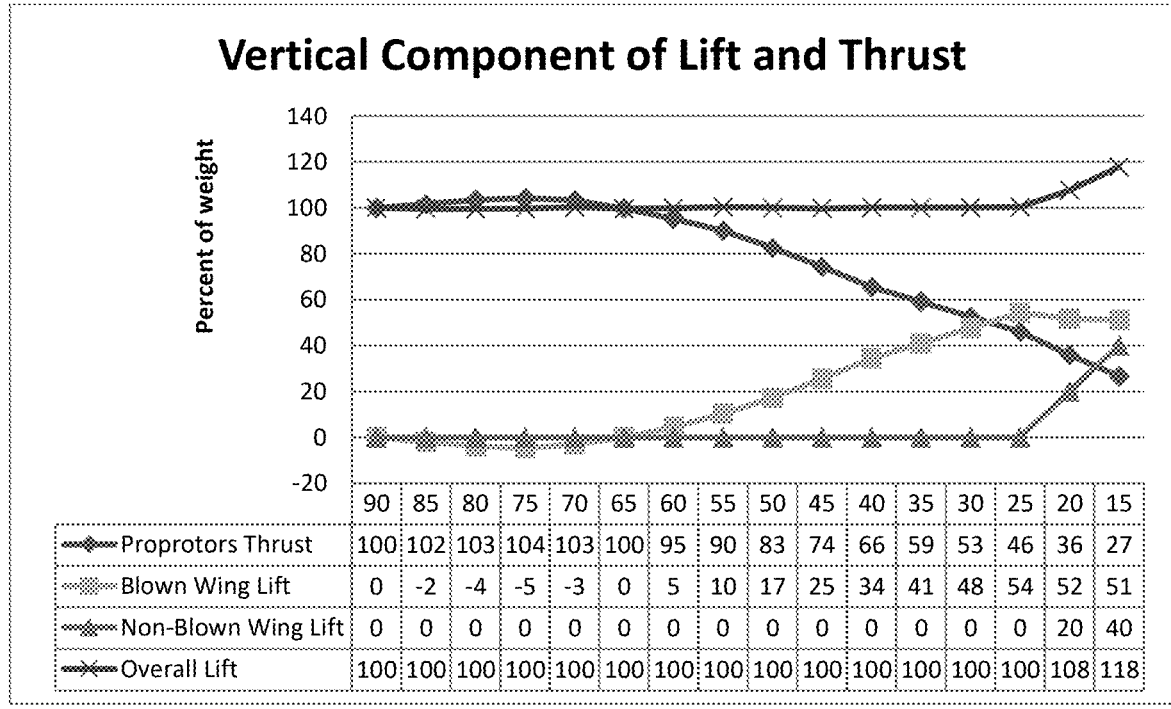
FIG. 37, is a diagram disclosing the vertical components of lift and thrust data of proprotors and rotor blown and non-blown wings together with overall lift for an exemplary aircraft.
Figure 38:
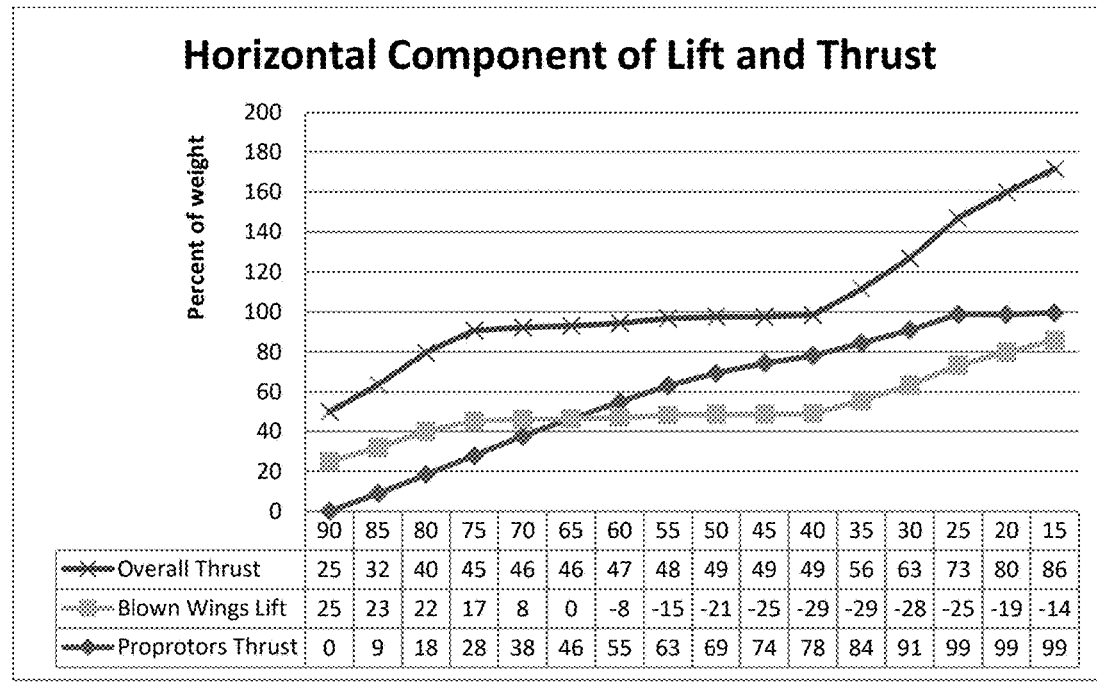
FIG. 38, is a diagram disclosing the horizontal components of lift and thrust data of proprotors and rotor blown and non-blown wings together with overall thrust for an exemplary aircraft.

An exemplary aircraft data is shown in FIG. 36, FIG. 37 and FIG. 38. In this example, the following amounts are considered:

Max. thrust provided by the proprotors=100% of the weight of the aircraft, with an overload capacity of 10%;

Max. Lift provided by the rotor blown wings=60% of the weight of the aircraft;

Max. Lift provided by the non-blown parts of the wings at slightly above stall speed and 15 degrees angle of attack=40% of the weight of the aircraft;

It should be kept in mind that according to various researches, the proprotor wash neutralizes the effect of front facing airflow on the rotor blow surfaces in all angles and it is considered to be zero.

If the aircraft is required to travel at a horizontal trajectory during the transition, the overall lift component in vertical direction is required to be equal to 100% of the weight of the aircraft at all the time during the transition.

In FIG. 36 the system data is shown for an assumptive scenario, when the angle of attack varies from 90 degrees to 15 degrees during transition. The overall thrust of the proprotors is equal to 100% of the weight when proprotors 14, 15, 16 or 17 are vertical to the ground and aircraft is in hover mode. In this example, the flight computer may increase the proprotors thrust up to 110 percent of the weight according to the flight conditions.

As mentioned before, since the bottom side of the wings 31, 32, and in some embodiments 35 and 36 faces the forward flight direction during hover mode, positive lift on the rotor blown wings results in negative thrust (acts like braking force), and negative lift on the rotor blown wings results in positive thrust (Thrust in positive direction of flight in hover mode). For this reason, in order to create positive thrust in hover mode, the rotor blown wings should create negative lift. It should be understood that the vector of the lift of the RBWs is nearly perpendicular to the airflow of the slipstream of the proprotors. So it's readily understood that the direction of rotor blown induced lift created by the RBWs is different from the total lift applied to the aircraft which is considered to be vertical to the horizon. For this reason, the horizontal and vertical components of RBWs lift is calculated which can be considered for calculation of overall lift, and overall thrust.

At high pitch angles, especially in the range of 90 to 65 degrees, positive lift of the RBWs produces negligible vertical component, but can apply considerable braking force (negative thrust) to the aircraft. Thus, at the first stage of the transition, creating positive lift by RBWs is avoided and the descend in the vertical component of lift of the proprotors 14, 15, 16 or 17 is compensated by overloading the proprotors (Increasing the thrust over the 100% mark, by increasing the speed or pitch angle of the proprotors). Instead, at this stage of transition, negative lift will be applied to the RBWs by adjusting the control surfaces 41, 42, and 45, 46, 48R, 48L, which results in increased overall thrust and negligible reduction in overall lift. The lift created by the rotor blown wings 31, 32, and in some embodiments 35 and 36 may vary from −25% to 60% of the weight (in this example). The flight computer modifies this amount by the means of control surfaces 41, 42, and in some embodiments 45 and 46. The lift created by the non-blown areas of the wings is zero at stall angles (above 20 degrees in this example). The lift of non-blown wing areas may reach up to 40% of the weight at critical angle of attack and above stall speed. This amount can also be modified by the control surfaces when the angle of attack is lower than the critical angle of attack.

FIG. 37 shows the vertical component of lift and thrust forces when the angle of attack varies from 90 degrees to 15 degrees during transition. As can be clearly seen, in this scenario, the overall lift is kept at 100% of the weight in all conditions. It means a smooth and safe transition is possible even without employing all the possible rotor blown wing lift capacity (60% of the weight) and without overloading the proprotors more than 10%. According to this figure, when the pitch angle drops below the critical angle of attack, the overall lift goes beyond 100% of the weigh even with reduced RBW lift. In this situation, in order to keep the altitude unchanged, the flight computer should lower the lift created by the blown and non-blown wings by adjusting the control surfaces. Otherwise, with the current numbers, the aircraft starts to ascent after the pitch reaches 20 degrees.

FIG. 38 illustrates the overall thrust when the angle of attack varies from 90 degrees to 15 degrees during transition. Horizontal component of thrust made by the proprotors varies from zero to 86% as the angle of attack descends. From 90 to 65 degrees, the blown wing produces negative drag, which converts to positive thrust in forward direction. From 65 to 15 degrees, the rotor blown wing parts produce positive lift, which results in negative thrust.

As describe above, and according to FIG. 36, during the transition, the rotor blown wings produce maximum negative lift at about 85~90 degrees pitch angle, and reach to the maximum positive lift at about 15 degrees pitch angle (angle of attack in this case). The angle where the lift of the rotor blown wings reaches zero, and enters the positive zone, is going to be called shift angle in this document. In the above example, the shift angle is 65 degrees. However, it is possible to have shift angle at 70 degrees, or 60 degrees. Depending on the choice of the designer, a shift angle between 35 and 80 is possible and the range of 60 to 70 degrees is the most efficient range.

In order to sum up, the transition has 2 distinguished phases:

Phase 1: Pitch angle above the "shift angle": The weight is carried solely by the proprotors. The forward thrust is created by the horizontal component of proprotors thrust and negative lift created by the rotor blown airfoil-shaped cross section bodies (wings, horizontal stabilizers) or a combination of both. The overall lift created by the rotor blown wings reaches zero at the end of this phase. It is possible to configure the rotor blown wings to create no lift all the way during this phase. However, creating negative lift helps the aircraft to speed up as fast as possible during this phase. This phase ends as the pitch angle descends to reach the "shift angle".

Phase 2: This phase starts as pitch drops below the" shift angle" and the transition continues until the angle of attack reaches "The wings critical angle of attack": In this phase, the resultant lift created by the rotor blown airfoil-shaped cross section bodies is positive. As this phase progresses, the overall positive lift created by the rotor blown airfoil-shaped cross section bodies increases to reach the maximum possible amount when the angle of attack reaches to the critical angle of attack of the wings, while the lift (vertical component of thrust) created by the proprotors decreases due to the pitch change.

The transition technically ends when the angle of attack equals "Critical angle of attack". From this point on, the aircraft operates as an airplane.

However, in the transition strategy which is preferred to be controlled by the flight computer, an important parallel strategy should be managed. The second strategy is about pitch control moment.

In order to start the transition or to end it, an angular acceleration or deceleration around the pitch axis should be created, which is provided by applying moment around the pitch axis. It is essential to have proper control on the pitch moment, pitch angular speed and pitch angular acceleration in order to assure the transition to end at the "critical angle of attack". Ending the transition at an angle much below the "critical angle of attack" may not provide enough lift to keep the aircraft in the air or a horizontal flight trajectory. A closed loop pitch angle speed control is essential, to manage the moment applied to the aircraft during the transition.

Considering the above-mentioned points, three exemplary transition strategies are described. The first strategy is for a VTOL with rotor blown nonplanar wing configuration with 3 or more proprotors capable of multirotor hover mode, and also with a rotor blown tail or rotor blown rear wings. The second strategy covers embodiments with multirotor capability, and while they have stabilizers, but the stabilizers are not rotor blown. The third strategy covers embodiments with fewer than 3 proprotors those do not have multirotor capabilities, but have a rotor blown tail or rotor blown rear wings.

An exemplary transition strategy for a tail siting VTOL with rotor blown nonplanar wing configuration with 3 or more proprotors is disclosed in the following paragraph and the numbering are based on the embodiment 1A and the same method of control is valid for embodiments 1B, 1C, 1D, 1E, 2F, 2G. The exemplary data is shown in FIG. 36 to FIG. 38.

The aircraft may be pitched down for a few degrees by differentiating the lift of the front wings and rear wings using control surfaces 41, 42, 45, 46 (for example by applying positive rotor blown induced lift on the rear wings, and/or negative lift on the front wings), or differentiating the thrust of the proprotors (like a multirotor pitch control, for example by applying higher thrust on the rear wing proprotors 16, comparing with the front wing proprotors 14), or by a combination of both methods. Horizontal movement starts by the means of the horizontal component of thrust created by the proprotors like a traditional multirotor, or by applying negative lift on the rotor blown control surfaces 41, 42 or by a combination of both. Negative lift may also be created by the rotor blown control surfaces 45, 46 in order to assist forward movement and resist the front facing airflow and keep the aft of the aircraft down. The amount of the negative lift created by the rotor blown surfaces 45, 46 is controlled by the flight computer in order to keep the pitch angle fixed and stable. When the forward hover speed passes 1.4~ 1.5 times the stall speed of the aircraft at the critical angle of attack, the flight computer may start the transition. The flight computer starts the transition by reducing the pitch angle by differentiating the lift of the front wings and rear wings using control surfaces 41, 42, 45, 46 or by differentiating the thrust created by the rear wing proprotors 16 and front wing proprotors 14, or by a combination of both methods. The first phase of transition ends when the pitch angle reaches the "Shift angle" which is a number defined by the designer and stored in the flight computer. In this exemplary case the "shift angle" is 65 degrees. During the first phase of the transition, the flight computer gradually increases the overall lift created by the rotor blown wings from −25% to 0% of the weight of the aircraft, to reach zero lift at the end of this phase, and in the meantime, increases the overall lift of the proprotors from 100% to 110% of the weight of the aircraft, to keep the overall vertical lift unchanged (FIG. 37). The second phase of transition starts at the "shift angle" and ends at the critical angle of attack. During this phase, the flight computer continues to pitch down and as the reduction in pitch angle causes the vertical component of lift created by the proprotors to decrease; the flight computer increases the overall rotor blown wings lift by means of controlling control surfaces 41, 42 from 0% to 60% of the weight of the aircraft. Depending on the set-up of the aircraft, the rear wings control surfaces 45, 46 may also be used to increase overall lift at this stage. As the pitch angle reaches to a predefined proximity of the "critical angle of attack" (for example 5 degrees, when the pitch angle is 20 degrees and the critical angle of attack is 15 degrees), by the means of a closed loop control system, the flight computer needs to create negative moment to cause angular deceleration to stop the rotation around pitch axis at the end of phase 2. The deceleration may be created by differentiating the thrust created by the front wing proprotors 14, and rear wing proprotors 16 (for example by increasing the thrust of front wing proprotors 14), or by differentiating the rotor blown induced lift on the front wings and rear wings using control surfaces 41,42, 45,46 or a combination of both methods. The transition ends when the angle of attack reaches the "critical angle of attack".

All the exemplary embodiments can follow the above-mentioned set of rules for transition control. The only difference being that the embodiments that lack rotor blown tail, may rely on multirotor controls for pitch control only, and the embodiments that have fewer than 3 proprotors, rely on the rotor blown horizontal stabilizers only for pitch control and combination of both is not available for them. Also the control surfaces 45 and 46 will be replaced by reference characters 48R and 48L for the embodiments that do not have a rear wing and have horizontal stabilizers instead.

With all this being said, in order to make the situation clearer, the transition strategy for other embodiments is also described below:

An exemplary transition strategy for a tail siting VTOL with rotor blown nonplanar wing configuration with 3 or more proprotors and without rotor blown stabilizers is disclosed in the following paragraph and the numbering are based on the embodiment 2A and the same method of control is valid for embodiments 2D, 2E, 2H, 2J. The exemplary data is shown in FIG. 36 to FIG. 38:

The aircraft may be pitched down for a few degrees by the means of applying higher thrust on higher proprotors 15 (for 2A, or 16 or upper row 17 in case of other embodiments) comparing with the lower proprotors 14. Horizontal movement starts by the means of the horizontal component of thrust created by the proprotors like a traditional multirotor, or by applying negative lift by the rotor blown control surfaces 41, 42 or by a combination of both. The stabilization of the pitch angle may be performed like a multirotor by differentiating the thrust of the proprotors. When the forward hover speed passes 1.4~1.5 times the stall speed of the aircraft at the critical angle of attack, the flight computer may start the transition. The flight computer starts the transition by further reducing the pitch angle (As described in this paragraph). The first phase of transition ends when the pitch angle reaches the "Shift angle" which is a number defined by the designer and stored in the flight computer. In this exemplary case the "shift angle" is 65 degrees. During the first phase of the transition, the flight computer gradually increases the overall lift created by the rotor blown wings from −25% to 0% of the weight of the aircraft, to reach zero lift at the end of this phase, and in the meantime, increases the overall lift of the proprotors from 100% to 110% of the weight of the aircraft, to keep the overall vertical lift unchanged (FIG. 37). The second phase of transition starts at the "shift angle" and ends at the critical angle of attack. During this phase, the flight computer continues to pitch down and as the reduction in pitch angle causes the vertical component of lift created by the proprotors to decrease; the flight computer increases the rotor blown wings lift by means of controlling control surfaces 41, 42 from 0% to 60% of the weight of the aircraft. As the pitch angle reaches to a predefined proximity of the "critical angle of attack" (for example 5 degrees, when the pitch angle is 20 degrees and the critical angle of attack is 15 degrees), by the means of a closed loop control system, the flight computer needs to create negative moment to cause angular deceleration to stop the rotation around pitch angle at the end of phase 2. The deceleration may be created by differentiating the thrust created by the lower proprotors 14, and higher proprotors 16 (for example by increasing the thrust of lower proprotors 14). The transition ends when the angle of attack reaches the "critical angle of attack".

The embodiment 2B, 2BB, and 2C perform the transition exactly the same as the previous method for 2A, 2D, 2E, 2H, 2J with the only difference being that the vertical wings extract during the transition.

An exemplary transition strategy for a tail siting VTOL with rotor blown nonplanar wing configuration with fewer than 3 proprotors is disclosed in the following paragraph and the numbering are based on the embodiment 1F Exactly the same method of control can be used for embodiment 2K. The exemplary data is shown in FIG. 36 to FIG. 38.

The embodiment should have at least one proprotor. The aircraft may be pitched down for a few degrees by the means of rotor-blown rear wings (or rotor blown tail horizontal stabilizers). Horizontal movement starts by the means of forces applied by the horizontal component of thrust created by the at least one proprotor 18, or by applying negative lift by the rotor blown control surfaces 41, 42 or by a combination of both. Negative lift is also created by the rotor blown control surfaces 45, 46 in order to assist forward movement and resist the front facing airflow and keep the aft of the aircraft down and stable. The amount of the negative lift created by the rotor blown surfaces 45, 46 is controlled by the flight computer in order to keep the pitch angle fixed and stable. When the forward hover speed passes 1.4~1.5 times the stall speed of the aircraft at the critical angle of attack, the flight computer may start the transition. The flight computer starts the transition by reducing the pitch angle by applying positive lift to the rear rotor blown control surfaces 45, 46. The first phase of transition ends when the pitch angle reaches the "Shift angle" which is a number defined by the designer and stored in the flight computer. In this exemplary case the "shift angle" is 65 degrees. During the first phase of the transition, the flight computer gradually increases the overall lift created by the rotor blown wings from −25% to 0% of the weight of the aircraft, to reach zero lift at the end of this phase, and in the meantime, increases the overall lift of the proprotors to keep the vertical component of the thrust created by the proprotors unchanged. The second phase of transition starts at the "shift angle" and ends at the critical angle of attack. During this phase, the computer continues to pitch down and as the reduction in pitch angle causes the vertical component of lift created by the proprotors to decrease; the flight computer increases the rotor blown wing lift by means of controlling control surfaces 41, 42, 45, 46 from 0% to 60% of the weight of the aircraft. As the pitch angle reaches to a predefined proximity of the "critical angle of attack", (for example 5 degrees, when the pitch angle is 20 degrees and the critical angle of attack is 15 degrees), by the means of a closed loop control system, the flight computer needs to create negative moment to cause angular deceleration to stop the rotation around pitch axis at the end of phase 2. The angular deceleration may be created by differentiating the rotor blown induced lift on the front wings and rear wings using control surfaces 41, 42, 45,46, for example applying negative lift on the control surfaces 45, 46, while the overall rotor blown lift may be kept unchanged by increasing the lift of the front wings at the same time by means of control surfaces 41, 42. The transition ends when the angle of attack reached the "critical angle of attack".

The landing transition for all the embodiments is much easier since the aircraft rides on rotor blown wings before the start of the process and an exemplary scenario can be disclosed as follows:

The flight computer or the pilot reduces the speed to be at a safe margin to the stall speed at the critical angle of attack, for example 1.4~ 1.5 times the stall speed. Then when reverse transition is initiated by the pilot or flight computer, the flight computer Increases the angle of attack to match the critical angle of attack. The flight computer increases the lift created by the rotor blown wings to the maximum amount and in the meantime pitches up by means of the rear control surfaces (e.g. elevators, elevens). As the pitch angle surpasses the critical angle of attack, the lift created by non-blown wings drops to zero and the weight is carried with the rotor blown wings and the vertical component of the proprotors thrust. The flight computer constantly calculates and controls the rotor blown lift and thrust vertical component of lift created by the proprotors, and keeps the altitude constant during the reverse transition by controlling the lift of proprotors and rotor blown wings. As the pitch angle increases, the horizontal element of lift created by the rotor blown wings acts as braking force further reducing the speed. The transition ends as the pitch angle reaches close to 90 degrees and the aircraft enters hover mode.

What is claimed is:

1. A tail sitting VTOL aircraft having its flight directional axis vertical when grounded, capable of three flight modes including an airplane mode, a hover mode wherein the fore side of the VTOL aircraft is directed upward, and a transition mode, said VTOL aircraft comprising:
   a. a fuselage with a fore side which defines a forward direction of flight in said airplane mode, a bottom side-which defines a forward direction of the flight in hover mode, and a top side-which defines a backward direction of the flight in hover mode;
   b. a computer to manage the flight;
   c. a control system;
   d. a plurality of sensors;
   e. at least three propulsion systems, at least three of said propulsion systems not positioned in a straight line when viewed from the fore side of said fuselage, enabling said VTOL aircraft to operate as a multi-rotor aircraft in hover mode;
   f. a plurality of rotor blown airfoil-shaped cross section bodies characterized by:
      being at least in part within the stream of air generated by at least one propulsion system;
      at least one of said rotor blown airfoil-shaped cross section bodies having at least one selectively controllable control surface, configured to modify the aerodynamics of said rotor blown airfoil-shaped cross section body resulting in generation of at least one of a positive or negative rotor blown induced lift;
      controlled positive or negative lift vectors created by said rotor blown airfoil-shaped cross section bodies being controlled by said control system and said computer whereas:
         a direction of said controlled positive or negative lift vectors depending on the direction of displacement of said at least one selectively controllable control surface;
         a magnitude of said controlled positive or negative lift vectors depending on at least one of a displacement of said at least one selectively controllable control surface or a speed of said stream of air generated by at least one propulsion system;
      said plurality of rotor blown airfoil-shaped cross section bodies including:
         a configuration of tandem rotor blown non-planar airfoil cross section bodies comprising:
            a first pair of right and left rotor blown airfoil-shaped cross section bodies in the form of a pair of right and left wings;
            a second pair of right and left rotor blown airfoil-shaped cross section bodies in the form of one of a pair of opposite wings or a pair of stabilizers;
            said top side of the fuselage defining the direction of positive lift created by said first pair of right and left rotor blown airfoil-shaped cross section bodies, and said second pair of right and left rotor blown airfoil-shaped cross section bodies;
            said bottom side of the fuselage defining the direction of negative lift created by said first pair of right and left rotor blown airfoil-shaped cross section bodies, and said second pair of right and left rotor blown airfoil-shaped cross section bodies;
            the first pair and the second pair of rotor-blown airfoil-shaped cross section bodies being in a tandem configuration, thus, positioned in two distinguishably different longitudinal positions of the VTOL aircraft, and also in two different heights in order to avoid aerodynamic interference in airplane mode;
   g. alighting devices connected to the aft of the VTOL aircraft;
   said airplane mode:
      characterized by the wings generating lift, an angle of attack of the wings remaining below a critical angle of attack to avoid a stall condition, and the propulsion systems providing forward thrust;
   said hover mode including take-off and landing operations being characterized by:
      the VTOL aircraft being carried by said propulsion systems as a multi-rotor aircraft;
      control forces and moments required for stabilization and aircraft position control being provided at least in part by the controlled positive or negative lift vectors created by said rotor blown airfoil-shaped cross section bodies;

being capable of a forward movement whereas said first and second pair of right and left rotor blown airfoil shaped cross section bodies provide negative rotor blown induced lift;

being capable of a backward movement whereas said first and second pair of right and left rotor blown airfoil shaped cross section bodies provide positive rotor blown induced lift;

being capable of rotation around pitch axis whereas a first pair of right and left rotor blown airfoil-shaped cross section bodies and a second pair of right and left rotor blown airfoil-shaped cross section bodies create different rotor blown induced lifts;

being capable of rotation around yaw axis whereas a right rotor blown airfoil-shaped cross section body and a left rotor blown airfoil-shaped cross section body create different rotor blown induced lifts;

said transition mode being characterized by:

comprising the process of transition from hover mode to airplane mode and vice versa, including rotation around pitch axis;

the weight of the VTOL aircraft at least in part being carried by said propulsion systems and at least in part by rotor blown induce positive lift including the period when the VTOL aircraft is in stall due to high angle of attack;

a required moment in order to perform rotation around pitch axis being provided at least in part by tandem rotor blown airfoil-shaped cross section bodies, by the means of differentiating the rotor blown induced lift of at least one of the rotor blown airfoil-shaped cross section bodies;

control forces and moments required for stabilization and aircraft position control being performed at least in part by the controlled positive or negative lift vectors created by said rotor blown airfoil-shaped cross section bodies.

2. The tandem rotor blown non-planar airfoil cross section bodies configuration according to claim 1 wherein at least one pair of left and right airfoil-shaped cross section bodies are interconnected.

3. The VTOL aircraft according to claim 1 wherein at least one of the airfoil-shaped cross section bodies has a winglet at its tip.

4. The VTOL aircraft according to claim 1 wherein at least one airfoil-shaped cross section body is one of dihedral and anhedral.

5. The VTOL aircraft according to claim 1 wherein at least one airfoil-shaped cross section bodies is a swept wing.

6. The VTOL aircraft according to claim 1 wherein at least one of the plurality of rotor blown airfoil-shaped cross section bodies, when viewed from the fore extremity in airplane mode, exhibits a curved shape.

7. The VTOL aircraft according to claim 1 wherein at least one of the at least three propulsion systems is one of a ducted fan, a contra-rotating dual disk propeller, a guarded propeller, a prop fan, a turboprop, a turbofan, an electric fan, a compressor fan.

8. The VTOL aircraft according to claim 1 wherein two rotor blown airfoil-shaped cross section bodies are connected and when viewed from the fore extremity of the VTOL aircraft, at least one corner resulted by connection of said two rotor blown airfoil-shaped cross section bodies is one of filleted and chamfered.

9. The VTOL aircraft according to claim 1 wherein each of the propulsion systems comprises a proprotor, (a) a first proprotor having a higher diameter and a blade profile configured for improved efficiency in hover mode and having feathering capability;

(b) a second proprotor having a smaller diameter and a blade profile configured for improved efficiency during airplane mode and at higher speeds.

10. The VTOL aircraft according to claim 1 wherein said plurality of rotor blown airfoil-shaped cross section bodies when viewed from the fore side of the VTOL aircraft include a non-horizontal member including a vertical, or a dihedral or an anhedral rotor blown airfoil-shaped cross section body having at least one selectively controllable control surface, controlled by the control system in order to create lateral forces in hover mode, transition mode, and low speed airplane mode.

11. The VTOL aircraft according to claim 1 wherein the center of lift (COL) of the first pair of right and left rotor blown airfoil-shaped cross section bodies is located between the center of gravity of the VTOL aircraft and the fore of the fuselage and the COL of the second pair of right and left rotor blown airfoil-shaped cross section bodies is located between the center of gravity and the aft of the VTOL aircraft and both the at least one front and at least one rear rotor blown airfoil-shaped cross section bodies contribute to carrying a portion of the weight of the VTOL aircraft.

12. The VTOL aircraft according to claim 1 wherein the first pair of right and left rotor blown airfoil-shaped cross section bodies are a pair of wings, and the second pair of right and left rotor blown airfoil-shaped cross section bodies are a pair of stabilizers.

13. The configuration of tandem rotor blown non-planar airfoil-shaped cross section bodies according to claim 1, wherein:

the first pair of right and left rotor blown airfoil-shaped cross section bodies is positioned such that its center of lift lies between the center of gravity of the VTOL aircraft and the fore of the VTOL aircraft;

the second pair of right and left rotor blown airfoil-shaped cross section bodies is positioned such that its center of lift lies between the center of gravity of the VTOL aircraft and the aft of the VTOL aircraft; and one of the first or second pairs of rotor blown airfoil-shaped cross section bodies is dihedral, and the other is anhedral.

14. The first pair of right and left rotor blown airfoil-shaped cross section bodies in the form of a pair of right and left wings according to claim 1 further comprising:

a right rotor blown vertical wing connected to a tip of the right wing;

a left rotor blown vertical wing connected to a tip of the left wing;

a right winglet connected to a tip of the right rotor blown vertical wing; and a left winglet connected to a tip of the left rotor blown vertical wing.

15. The configuration of tandem rotor blown non-planar airfoil cross section bodies configuration according to claim 1 wherein:

the first pair of right and left rotor blown airfoil-shaped cross section bodies is in the form of a first pair of right and left wings;

the second pair of right and left rotor blown airfoil-shaped cross section bodies is in the form of a second pair of left and right wings;

at least one of the first or second pairs of wings is anhedral or dihedral;

the first right wing and the second right wing are joined at a connection point that coincides with the tip of at least one of said wings;

the first left wing and the second left wing are joined at a connection point that coincides with the tip of at least one of said wings.

16. The tandem rotor blown non-planar airfoil cross section bodies configuration according to claim 1 comprising:

the first pair of right and left rotor blown airfoil-shaped cross section bodies are in the form of a first pair of right and left wings;

the second pair of right and left rotor blown airfoil-shaped cross section bodies are in the form of a second pair of left and right wings;

said tandem rotor blown non-planar airfoil cross section bodies configuration further comprising:

a third pair of airfoil-shaped cross section bodies including a left and right body;

the third right airfoil-shaped cross section body, connecting between the first right wing and second right wing;

the third left airfoil-shaped cross section body, connecting between the first left wing and second left wing;

the combination forming the structure of a nonplanar closed bi-plane wing configuration.

17. The VTOL aircraft according to claim 16 wherein each of the third pair of airfoil-shaped cross section bodies, is connected to the tip of at least one of the wings it connects together.

18. The VTOL aircraft according to claim 16 wherein the third pair of airfoil-shaped cross section bodies are vertical and act as rotor blown vertical wings (RBVWs).

19. The VTOL aircraft according to claim 16 with the longitudinal location of the center of lift of the one pair of wings between the center of gravity and fore of the VTOL aircraft, and the longitudinal location of the other pair of wings located between the center of gravity and the aft of the VTOL aircraft and the weight of the VTOL aircraft is distributed between two pairs of wings in airplane mode forming a nonplanar closed tandem bi-plane wing configuration.

20. The VTOL aircraft according to claim 19 wherein the rear pair of wings are forward swept and have at least one control surface which is located between the middle and the outboard of each wing, and therefore is distanced from the ground when the VTOL aircraft is landed having its flight directional axis vertical and said alighting devices connected to the aft of the VTOL aircraft are positioned on the ground in order to reduce the effect of change of direction of the airflow of the propulsion systems when the VTOL aircraft is close to the ground.

21. The VTOL aircraft according to claim 19 wherein the inboard end of at least one of the rear wings, is connected to the end tip of a stabilizer.

* * * * *